(12) United States Patent
Ogawa et al.

(10) Patent No.: US 11,538,191 B2
(45) Date of Patent: Dec. 27, 2022

(54) ELECTRONIC APPARATUS USING CALIBRATION OF A LINE OF SIGHT INPUT, CONTROL METHOD OF ELECTRONIC APPARATUS USING CALIBRATION OF A LINE OF SIGHT INPUT, AND NON-TRANSITORY COMPUTER READABLE MEDIUM THEREOF

(71) Applicant: CANON KABUSHIKI KAISHA, Tokyo (JP)

(72) Inventors: Seiji Ogawa, Tokyo (JP); Shin Murakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/327,404

(22) Filed: May 21, 2021

(65) Prior Publication Data
US 2021/0375002 A1 Dec. 2, 2021

(30) Foreign Application Priority Data
May 26, 2020 (JP) .............................. JP2020-091237

(51) Int. Cl.
*G06T 7/80* (2017.01)
*H04N 5/232* (2006.01)
*G06F 3/01* (2006.01)

(52) U.S. Cl.
CPC ........... *G06T 7/80* (2017.01); *H04N 5/23212* (2013.01); *H04N 5/23216* (2013.01); *H04N 5/23219* (2013.01); *G06T 2207/30201* (2013.01)

(58) Field of Classification Search
CPC ... G06T 7/80; G06T 2207/30201; G06T 7/73; H04N 5/23212; H04N 5/23216; H04N 5/23219; H04N 5/232127; H04N 5/23293; H04N 5/232933; H04N 5/232945;
(Continued)

(56) References Cited

U.S. PATENT DOCUMENTS

| 8,508,614 B2* | 8/2013 | Segal .................. H04N 5/2222 348/222.1 |
| 8,917,913 B2* | 12/2014 | Kritt ..................... G06V 20/30 382/118 |
| 9,639,987 B2* | 5/2017 | Fahey .................. H04N 5/2224 |

(Continued)

FOREIGN PATENT DOCUMENTS

JP          2015207290 A     11/2015

*Primary Examiner* — Usman A Khan
(74) *Attorney, Agent, or Firm* — Canon U.S.A., Inc. IP Division

(57) ABSTRACT

A indicator is moved from a first position based on a line-of-sight input to a second position according to a moving operation performed on an operating member that receives a user operation different from the line-of-sight input, (a) calibration of an input position in accordance with the line of sight, on a basis of the first position and the second position, is not performed in a case where an instruction operation for executing specific processing at a position of the indicator is not performed, and (b) calibration of the input position in accordance with the line of sight is performed on a basis of the first position and the second position in a case where an instruction operation for executing the specific processing is performed in a state in which there is no additional moving operation, and a specific condition is satisfied.

19 Claims, 14 Drawing Sheets

(58) Field of Classification Search
CPC .... H04N 17/002; H04N 5/2251; G06F 3/013; G06F 3/04883
USPC ..................................................... 348/222.1
See application file for complete search history.

(56) References Cited

U.S. PATENT DOCUMENTS

| | | | | |
|---|---|---|---|---|
| 9,832,441 | B2* | 11/2017 | Osman | G07F 17/3216 |
| 2004/0212712 | A1* | 10/2004 | Stavely | H04N 5/23218 |
| | | | | 348/333.03 |
| 2006/0038833 | A1* | 2/2006 | Mallinson | H04N 1/00323 |
| | | | | 345/633 |
| 2007/0081090 | A1* | 4/2007 | Singh | H04N 1/00132 |
| 2009/0033786 | A1* | 2/2009 | Finkelstein | G03B 13/36 |
| | | | | 348/E5.024 |
| 2009/0190093 | A1* | 7/2009 | Tanassi | A61B 3/117 |
| | | | | 351/208 |
| 2011/0006978 | A1* | 1/2011 | Yuan | G06F 3/0481 |
| | | | | 351/209 |
| 2012/0146891 | A1* | 6/2012 | Kalinli | H04N 19/167 |
| | | | | 345/156 |
| 2012/0154277 | A1* | 6/2012 | Bar-Zeev | G06F 3/013 |
| | | | | 345/158 |
| 2013/0155309 | A1* | 6/2013 | Hill | H04N 5/232945 |
| | | | | 348/E5.045 |
| 2014/0092006 | A1* | 4/2014 | Boelter | G09G 5/363 |
| | | | | 345/156 |
| 2016/0291690 | A1* | 10/2016 | Thorn | H04N 5/23216 |
| 2018/0191952 | A1* | 7/2018 | Ardo | H04N 5/23219 |
| 2019/0158713 | A1* | 5/2019 | Mcmillan | H01L 27/3234 |

\* cited by examiner

FIG. 11A

| | | |
|---|---|---|
| ◉ | ▶ | ★ |

1 2 3 4 5

- 1101 — AF TYPE — [1-POINT] FACE + TRACKING
- 1102 — TOUCH & DRAG AF — ABSOLUTE [RELATIVE]
- 1103 — DETAILED LINE-OF-SIGHT AF SETTING ...
- 1104 — DETAILED MC CENTER BUTTON SETTING ...

FIG. 11B

DETAILED LINE-OF-SIGHT AF SETTING

- 1105 — LINE-OF-SIGHT AF [ENABLED] DISABLED
- 1106 — POINTER DISPLAY [ENABLED] DISABLED
- 1107 — POINTER SENSITIVITY +2
- 1108 — SW1 LINE-OF-SIGHT CONFIRMATION ENABLED [DISABLED]
- 1109 — CAL NUMBER 3 (glasses1) UNEXECUTED
- 1110 — CAL 1109a  1109b  1109c

FIG. 11C

CAL

- 1111 — EXECUTE
- 1112 — DELETE
- 1113 — STORE/READ IN/FROM CARD
- 1114 — CAL CORRECTION [ENABLED] DISABLED

ELECTRONIC APPARATUS USING CALIBRATION OF A LINE OF SIGHT INPUT, CONTROL METHOD OF ELECTRONIC APPARATUS USING CALIBRATION OF A LINE OF SIGHT INPUT, AND NON-TRANSITORY COMPUTER READABLE MEDIUM THEREOF

BACKGROUND

Field

The present disclosure relates to an electronic apparatus, and particularly, to an electronic apparatus capable of detecting a line of sight.

Description of the Related Art

An electronic apparatus operated by a line of sight of a user (hereinafter, line-of-sight input) is known. Particularly, input of a line-of-sight is effective in a case where a user wants to provide quick instructions to operate an electronic apparatus, such as a digital camera and a game console.

To perform line-of-sight input with high accuracy, calibration (hereinafter, CAL) is necessary. Although the accuracy of line-of-sight input is improved when CAL is performed a number of times, it is inconvenient, in general, to perform CAL a number of times because laborious operation is required for each of the CAL operations. To solve this, a technology (automatic CAL correction) for performing CAL correction, as required, during ordinary use of an electronic apparatus has been proposed.

For example, Japanese Patent Application Publication No. 2015-207290 discloses a technology for generating CAL correction data by calculating a deviation from a position of a line of sight according to a touch position/cursor position.

However, in the technology disclosed in Japanese Patent Application Publication No. 2015-207290, a configuration is provided in which CAL correction is performed whenever a touch position/cursor position is moved. Accordingly, CAL correction can be performed even at the time of a user operation that is not intended for fine adjustment, and thus the accuracy of line-of-sight input can deteriorate.

SUMMARY

Various embodiments of the present disclosure provide an electronic apparatus capable of executing calibration such that the accuracy of line-of-sight input in ordinary use can be improved more reliably.

According to one embodiment, an electronic apparatus includes: a line-of-sight input member configured to receive a line-of-sight input that is a position input in accordance with a line of sight of a user; and at least one memory and at least one processor which function as a control unit configured to perform control such that an indicator is displayed at a first position based on the line-of-sight input, the indicator is moved from the first position to a second position according to a moving operation performed on an operating member that receives a user operation different from the line-of-sight input, (a) calibration of the input position in accordance with the line of sight, on a basis of the first position and the second position, is not performed in a case where an instruction operation for executing specific processing at a position of the indicator is not performed, and (b) calibration of the input position in accordance with the line of sight is performed on the basis of the first position and the second position in a case where an instruction operation for executing the specific processing is performed in a state in which there is no additional moving operation, and a specific condition is satisfied.

Further features will become apparent from the following description of exemplary embodiments with reference to the attached drawings.

BRIEF DESCRIPTION OF THE DRAWINGS

FIGS. 11A to 11C are display examples of setting menu screens according to one embodiment.

DESCRIPTION OF THE EMBODIMENTS

External View of Digital Camera 100

Figure 1A:
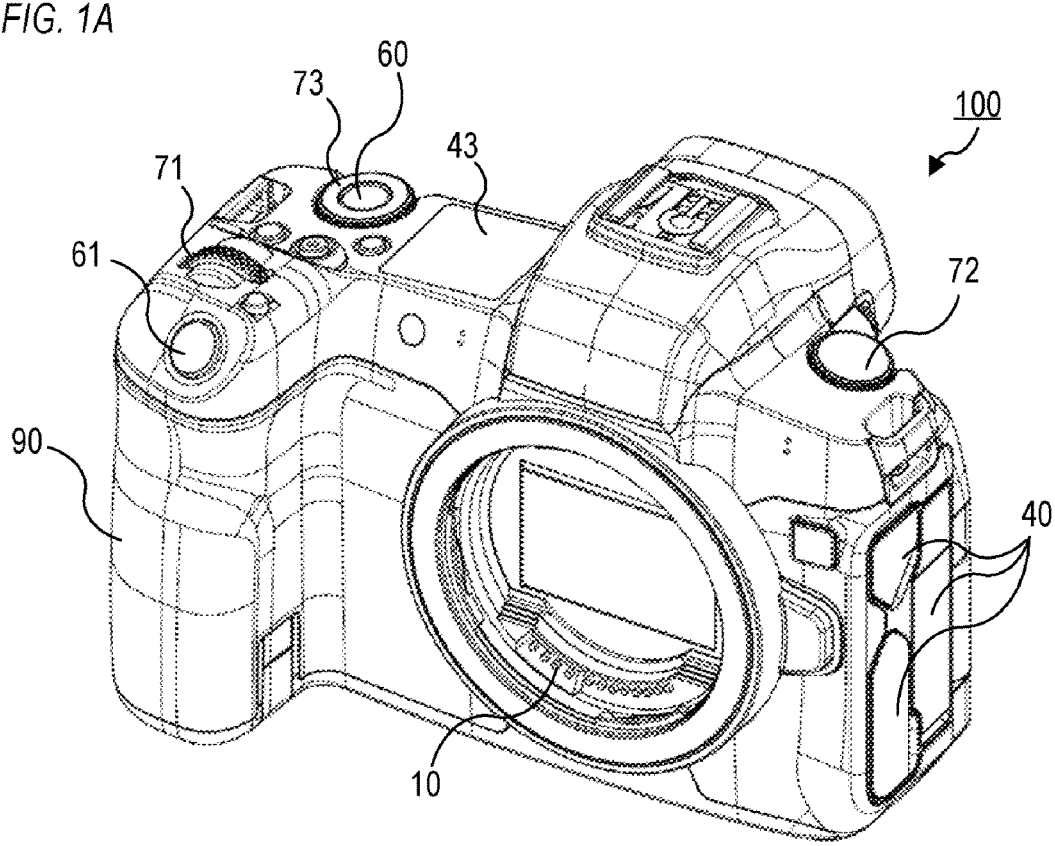
FIGS. 1A and 1B are external views of a digital camera according to one embodiment.
Figure 1B:
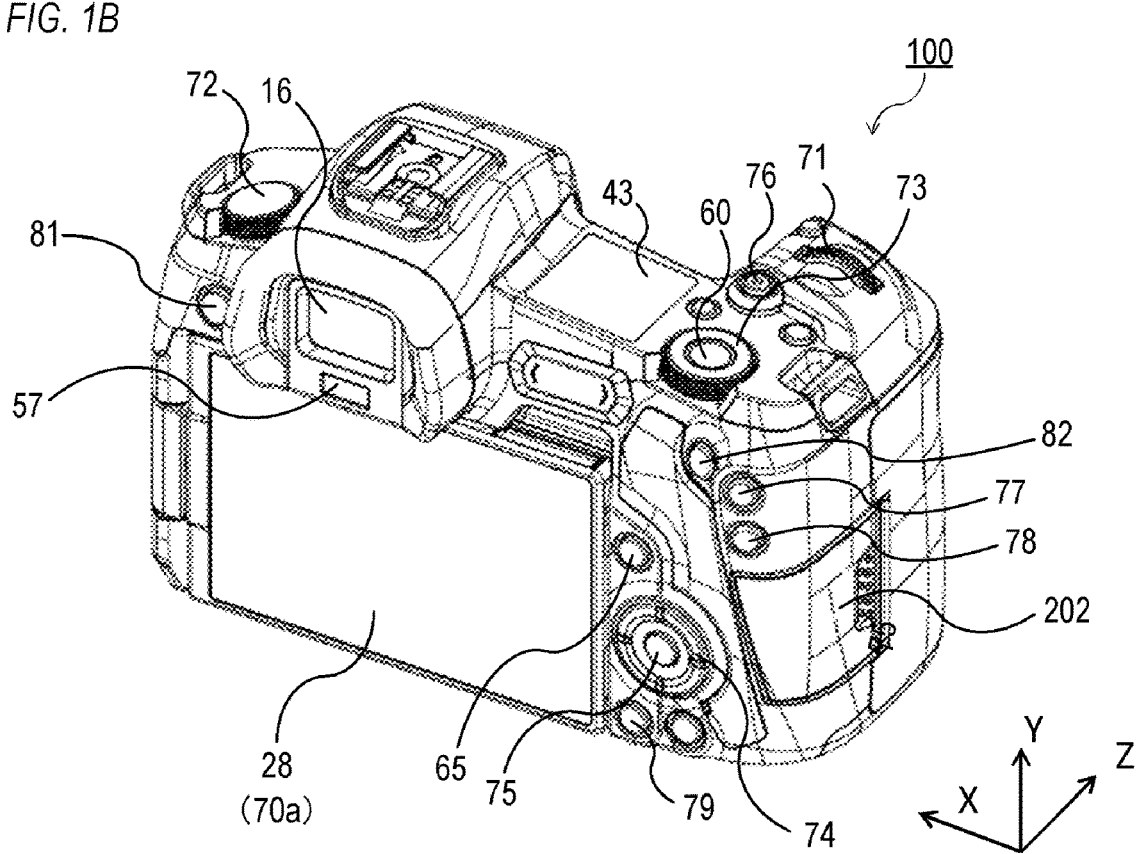

Hereinafter, various embodiments of the present invention will be described with reference to the drawings. FIGS. 1A and 1B are external views of a digital camera 100 as an example of a device to which various embodiments of the present disclosure are applicable. FIG. 1A is a front perspective view of the digital camera 100 and FIG. 1B is a rear perspective view of the digital camera 100 according to one embodiment.

A display unit 28 is provided on the backside of the digital camera 100 and displays images and various types of information. A touch panel 70a can detect a touch operation on a display surface (touch operation surface; touch operating member) of the display unit 28. A display unit 43 other than a finder is provided on the top surface of the digital camera 100 and displays various setting values of the digital camera 100 including a shutter speed and an aperture. A shutter button 61 is an operating member for performing a shooting instruction (imaging instruction). A mode changeover switch 60 is an operating member for switching between various modes. A terminal cover 40 is a cover for protecting a connector (not shown) that connects the digital camera 100 to an external apparatus.

A main electronic dial 71 is a rotary operating member, and change of setting values such as a shutter speed and an aperture, and the like are performed by rotating the main electronic dial 71. A power switch 72 is an operating member for switching between ON and OFF of supply of power to the digital camera 100. A sub-electronic dial 73 is a rotary operating member, and movement of a selection frame (cursor), image transmission, and the like are performed by rotating the sub-electronic dial 73. A 4-direction key 74 is configured such that top, bottom, left and right parts thereof can be respectively pushed, and processing corresponding to a pushed part of the 4-direction key 74 can be performed. A SET button 75 is a push button and is mainly used for determination of a selected item, and the like. A multi-controller (hereinafter, MC) 65 can receive direction indications to eight directions and a center part pushing operation.

A moving image button 76 is used to instruct starting or stopping of moving image shooting (recording). AE lock button 77 is a push button, and an exposure state can be fixed by pressing the AE lock button 77 in a shooting standby state. A zoom-in button 78 is an operating button for switching between ON and OFF of a zoom-in mode in live view display (LV display) as a shooting mode. Zoom-in or zoom-out of a live view image (LV image) can be performed by operating the main electronic dial 71 after the zoom-in mode is set to ON. In a playback mode, the zoom-in button 78 serves as an operating button for zooming in in a playback image or increasing a magnification ratio thereof. A playback button 79 is an operating button for switching between the shooting mode and the playback mode. It is possible to perform transition to the playback mode and display a latest image from among images recorded on a recording medium 200 (which will be described later) on the display unit 28 by pressing the playback button 79 in the shooting mode. A menu button 81 is a push button used to perform an instruction operation for displaying a menu screen, and the menu screen through which various settings can be performed is displayed on the display unit 28 when the menu button 81 is pressed. A user can intuitively perform various settings using the menu screen displayed on the display unit 28, the 4-direction key 74, and the SET button 75, or the MC 65. A line-of-sight confirmation button 82 is an operating member included in an operating unit 70 and is a push button for instructing selective execution or cancellation with respect to an object based on a position of a line-of-sight pointer which will be described later. The line-of-sight confirmation button 82 is disposed at a position at which it can be easily manipulated even in a state in which a user is looking in a finder (a state in which a user's eye is close to an eyepiece part 16) and disposed at a position at which it can be manipulated with the thumb of the right hand holding a grip part 90.

A communication terminal 10 is a communication terminal for the digital camera 100 to perform communication with a lens unit 150 (which will be described later and is detachable). The eyepiece part 16 is an eyepiece part of an eyepiece finder (look-in type finder), and a user can visually recognize a video displayed on an internal EVF 29 (which will be described later) through the eyepiece part 16. An eyepiece detection unit 57 is an eyepiece detection sensor that detects whether an eye of a user (photographer) is in proximity to the eyepiece part 16. A lid 202 is a lid of a slot in which the recording medium 200 (which will be described later) is stored. The grip part 90 is a holder having a shape easily held by the right hand when a user has the digital camera 100 at the ready. The shutter button 61 and the main electronic dial 71 are disposed at positions at which they can be manipulated with the index finger of the right hand in a state in which the grip part 90 is held by the little finger, the ring finger, and the middle finger of the right hand to hold the digital camera 100. Further, in the same state, the sub-electronic dial 73 and the line-of-sight confirmation button 82 are disposed at positions at which they can be manipulated with the thumb of the right hand.

Configuration Block Diagram of Digital Camera 100

Figure 2:
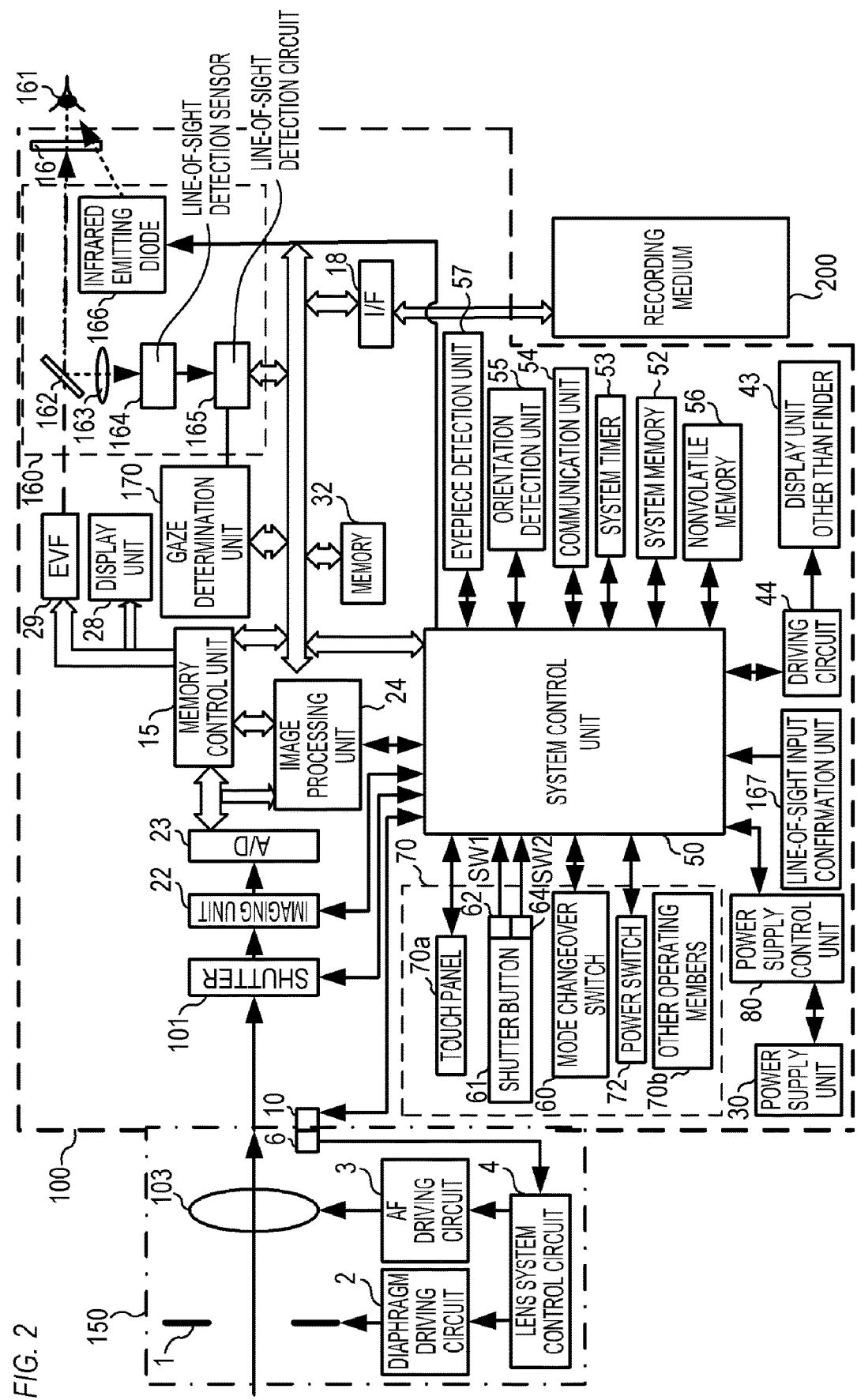
FIG. 2 is a block diagram of the digital camera according to one embodiment.

FIG. 2 is a block diagram illustrating a configuration example of the digital camera 100. The lens unit 150 is a lens unit in which exchangeable shooting lenses are mounted. Although a lens 103 is generally composed of a plurality of lenses, FIG. 2 simply illustrates only one lens. A communication terminal 6 is a communication terminal for the lens unit 150 to perform communication with the side of the digital camera 100, and the communication terminal 10 is a communication terminal for the digital camera 100 to perform communication with the side of the lens unit 150. The lens unit 150 communicates with a system control unit 50 via these communication terminals 6 and 10. In addition, the lens unit 150 controls a diaphragm 1 according to a lens system control circuit 4 provided therein via a diaphragm driving circuit 2. Further, the lens unit 150 focuses by displacing the lens 103 according to the lens system control circuit 4 via an AF driving circuit 3.

A shutter 101 is a focal-plane shutter capable of freely controlling an exposure time of an imaging unit 22 according to control of the system control unit 50.

The imaging unit 22 is an imaging element configured as a CCD or CMOS element, or the like which converts an optical image into an electrical signal. The imaging unit 22 may have an imaging plane phase difference sensor that outputs focus amount information to the system control unit 50.

An image processing unit 24 performs predetermined processing (pixel interpolation, resizing processing such as reduction, color conversion processing, etc.) on data from an A/D converter 23 or data from a memory control unit 15. In addition, the image processing unit 24 performs predetermined arithmetic operation processing using captured image data, and the system control unit 50 performs exposure control and distance measurement control on the basis of arithmetic operation results obtained by the image processing unit 24. Accordingly, through the lens (TTL) type auto focus (AF) processing, auto exposure (AE) processing, flash pre-light emission (EF) processing, and the like are performed. Further, the image processing unit 24 performs predetermined arithmetic operation processing using captured image data and performs TTL type auto white balance (AWB) processing on the basis of an obtained arithmetic operation result.

The memory control unit 15 controls transmission and reception of data between the A/D converter 23, the image processing unit 24, and a memory 32. The output data from the A/D converter 23 is written in the memory 32 through the image processing unit 24 and the memory control unit 15. Alternatively, output data from the A/D converter 23 is written in the memory 32 through the memory control unit 15 without passing through the image processing unit 24. The memory 32 stores image data acquired by the imaging unit 22 and converted into digital data by the A/D converter 23 and image data to be displayed on the display unit 28 or the EVF 29. The memory 32 has a storage capacity sufficient to store a predetermined number of still images and a moving image and sound for a predetermined time.

In addition, the memory 32 also serves as a memory for image display (video memory). Image data for display written in the memory 32 is displayed by the display unit 28 or the EVF 29 through the memory control unit 15. Each of the display unit 28 and the EVF 29 performs display in response to a signal from the memory control unit 15 on a display device such as an LCD, an organic EL, or the like. Live view (LV) display can be performed in such a manner that data A/D-converted by the A/D converter 23 and stored in the memory 32 is sequentially transferred to the display unit 28 or the EVF 29 and displayed thereon. Hereinafter, an image displayed through live view display will be referred to as a live view image (LV image).

A line-of-sight detection unit 160 (receiving unit) detects a line of sight of a user's eye in proximity to the eyepiece part 16 toward the EVF 29. The line-of-sight detection unit 160 includes a dichroic mirror 162, an imaging lens 163, a line-of-sight detection sensor 164, a line-of-sight detection circuit 165, and an infrared emitting diode 166.

The infrared emitting diode 166 is a light-emitting element for detecting a position of a line of sight of a user in a finder screen and radiates infrared light to an eyeball (eye) 161 of the user. The infrared light radiated from the infrared emitting diode 166 is reflected from the eyeball (eye) 161 and this infrared reflected light arrives at the dichroic mirror 162. The dichroic mirror 162 reflects only infrared light and transmits visible light. The infrared reflected light having a changed optical path is imaged on an imaging plane of the line-of-sight detection sensor 164 through the imaging lens 163. The imaging lens 163 is an optical member constituting a line-of-sight detection optical system. The line-of-sight detection sensor 164 is composed of an imaging device such as a CCD type image sensor.

The line-of-sight detection sensor 164 photoelectrically converts incident infrared reflected light into an electrical signal and outputs the electrical signal to the line-of-sight detection circuit 165. The line-of-sight detection circuit 165 detects a position of a line of sight of the user from a motion of the eyeball (eye) 161 of the user on the basis of the output signal of the line-of-sight detection sensor 164 and outputs the detected information to the system control unit 50 and a gaze determination unit 170.

The gaze determination unit 170 determines, when a period in which a line of sight of the user is fixed to a certain region exceeds a predetermined threshold value, that the user is gazing at this region on the basis of detection information received from the line-of-sight detection circuit 165. Accordingly, the region can be called a gaze position (gaze region) that is a position at which gazing is being performed. Meanwhile, "a line of sight is fixed to a certain region" may mean that an average position in motions of the line of sight is within the region until a predetermined period elapses and a dispersion (variance) is less than a predetermined value, for example. Further, the predetermined threshold value may be arbitrarily changed by the system control unit 50. In addition, the gaze determination unit 170 may not be provided as an independent block and the system control unit 50 may execute the same function as that of the gaze determination unit 170 on the basis of detected information received from the line-of-sight detection circuit 165.

In the present embodiment, the line-of-sight detection unit 160 detects a line of sight using a method (type) called a corneal reflex method. The corneal reflex method is a method of detecting a direction and a position of a line of sight from a positional relationship between reflected light obtained when infrared light emitted from the infrared emitting diode 166 is reflected from the eyeball (eye) 161 (particularly, cornea) and the pupil of the eyeball (eye) 161. Meanwhile, a type of detecting a line of sight (a direction and a position of a line of sight) is not particularly limited and types other than the aforementioned one may be used. For example, a method (type) called a limbus tracking method using the fact that the iris and the whites of the eyes have different light reflectivities may be used.

The display unit 43 other than the finder displays various setting values of the camera including a shutter speed and an aperture through a driving circuit 44 for the display unit other than the finder.

A nonvolatile memory 56 is an electrically erasable and recordable memory and may be, for example, a flash-ROM or the like. The nonvolatile memory 56 records constants for operation of the system control unit 50, programs, and the like. Here, the programs refer to programs for executing various flowcharts which will be described in the present embodiment.

The system control unit 50 is a control unit composed of at least one processor or circuit and controls the overall digital camera 100. The system control unit 50 realizes each processing of the present embodiment which will be described later by executing programs recorded in the above-described nonvolatile memory 56. A system memory 52 may be a RAM, for example, and the system control unit 50 develops constants and variables for the operation of the system control unit 50, a program read from the nonvolatile memory 56, and the like in the system memory 52. In addition, the system control unit 50 performs display control by controlling the memory 32, the display unit 28, and the like.

A system timer 53 is a clock part that measures time used for various types of control and time of an embedded clock.

A power supply control unit 80 is composed of a battery detection circuit, a DC-DC converter, a switch circuit that switches blocks provided with electric power, and the like and performs detection of presence or absence of a mounted battery, a battery type, and a remaining battery level, and the like. In addition, the power supply control unit 80 controls the DC-DC converter on the basis of the detection result and an instruction of the system control unit 50 and supplies a necessary voltage to each part including the recording medium 200 for a necessary period. A power supply unit 30 is composed of a primary battery such as an alkali battery or a lithium battery, a secondary battery such as a NiCd battery, a NiMH battery, or an Li battery, an AC adaptor, and the like.

A recording medium I/F 18 is an interface with the recording medium 200 such as a memory card or a hard disk. The recording medium 200 is a recording medium such as a memory card for recording captured images and is composed of a semiconductor memory, a magnetic disk, and the like.

A communication unit 54 performs transmission/reception of a video signal and an audio signal to/from an external apparatus connected wirelessly or through a wired cable. The communication unit 54 can be connected to a wireless local area network (LAN) and the Internet. In addition, the communication unit 54 can communicate with external apparatuses through Bluetooth (registered trademark) and Bluetooth Low Energy. The communication unit 54 can transmit images captured by the imaging unit 22 (including LV images) and images recorded in the recording medium 200 and receive image data from external apparatuses and various other types of information.

An orientation detection unit 55 detects an orientation of the digital camera 100 with respect to the direction of gravity. It is possible to determine whether an image captured by the imaging unit 22 is an image captured by horizontally holding the digital camera 100 or an image captured by vertically holding the digital camera 100 on the basis of an orientation detected by the orientation detection unit 55. The system control unit 50 can add direction information in response to an orientation detected by the orientation detection unit 55 to an image file of an image captured by the imaging unit 22 or rotate the image and record the image. As the orientation detection unit 55, an acceleration sensor, a gyro sensor, or the like can be used. It is also possible to detect a movement (panning, tilting, lifting up, whether it is stopped, or the like) of the digital camera 100 using an acceleration sensor or a gyro sensor as the orientation detection unit 55.

The eyepiece detection unit 57 is an eyepiece detection sensor that detects proximity (eye proximity) and separation (eye separation) of the eye (object) 161 with respect to the eyepiece part 16 of an eyepiece finder (hereinafter, simply referred to as a "finder") (proximity detection). The system control unit 50 switches between display (display state)/non-display (non-display state) of the display unit 28 and the EVF 29 in response to a state detected by the eyepiece detection unit 57. More specifically, at least in a shooting standby state and in a case where switching of display destinations is automatic switching, the display unit 28 is set to a display destination and display is ON and the EVF 29 is not displayed when an eye is not in proximity to the eyepiece part 16. In addition, the EVF 29 is set to a display destination and display is ON and the display unit 28 is not displayed when an eye is in proximity to the eyepiece part 16. An infrared proximity sensor can be used as the eyepiece detection unit 57, for example, and can detect proximity of any object to the eyepiece part 16 of the finder including the EVF 29. When an object has become closer, infrared rays projected from a light projecting part (not shown) of the eyepiece detection unit 57 are reflected from the object and received by a light receiving part (not shown) of the infrared proximity sensor. It is possible to determine a distance between the object and the eyepiece part 16 (eyepiece distance) depending on the amount of received infrared rays. In this manner, the eyepiece detection unit 57 performs eyepiece detection for detecting a proximity distance of an object to the eyepiece part 16. In a case where an object in proximity to the eyepiece part 16 within a predetermined distance therefrom is detected in a non-eyepiece state (non-proximity state), it is assumed that eye proximity is detected. In a case where an object detected as an object in proximity to the eyepiece part 16 is separated by at least a predetermined distance in an eye proximity state (proximity state), it is assumed that eye separation is detected. A threshold value used to detect eye proximity and a threshold value used to detect eye separation may be different by providing hysteresis, for example. In addition, a state after eye proximity is detected is assumed to be an eye proximity state until eye separation is detected. A state after eye separation is detected is assumed to be a non-eye proximity state until eye proximity is detected. Meanwhile, the infrared proximity sensor is an example and other sensors may be employed as the eyepiece detection unit 57 as long as they can detect proximity of an eye or an object that is considered to be eye proximity.

The system control unit 50 can detect the following states of a line of sight toward the EVF 29 by controlling the line-of-sight detection unit 160.

A state in which a line of sight which is not directed to the EVF 29 is newly directed to the EVF 29. That is, start of line-of-sight input.

A state in which line-of-sight input for the EVF 29 is performed.

A state in which a certain position in the EVF 29 is gazed.

A state in which a line of sight directed to the EVF 29 has been taken away. That is, end of input of a line of sight.

A state in which any line-of-sight input to the EVF 29 is not performed (a state in which the EVF 29 is not viewed).

The system control unit 50 is notified of these operations/states and a position (direction) at which a line of sight is directed to the EVF 29 through an internal bus and determines line-of-sight input which is being performed on the basis of the notified information.

The operating unit 70 is an input unit that receives an operation from a user (user operation) and is used to input various operation instructions to the system control unit 50. As illustrated in FIG. 2, the operating unit 70 includes the mode changeover switch 60, the shutter button 61, the power switch 72, the touch panel 70*a*, and the like. In addition, the operating unit 70 includes, as other operating members 70*b*, the main electronic dial 71, the sub-electronic dial 73, the 4-direction key 74, the SET button 75, the moving image button 76, the AE lock button 77, the zoom-in button 78, the playback button 79, the menu button 81, the MC 65, and the like.

The mode changeover switch 60 switches an operation mode of the system control unit 50 to any of a still image shooting mode, a moving image shooting mode, a playback mode, and the like. There are an auto shooting mode, an auto scene determination mode, a manual mode, a diaphragm priority mode (Av mode), a shutter speed priority mode (Tv mode), and a program AE mode (P mode) as modes included in the still image shooting mode. In addition, there are various scene modes for shooting settings for respective shooting scenes, a custom mode, and the like. A user can directly switch the operation mode to any of these modes through the mode changeover switch 60. Alternatively, it may be possible to temporarily switch to a screen of a list of shooting modes through the mode changeover switch 60 and then selectively switch to any of a plurality of displayed modes using another operating member. Likewise, the moving image shooting mode may also include a plurality of modes.

The shutter button 61 includes a first shutter switch 62 and a second shutter switch 64. The first shutter switch 62 is turned on through so-called half press (shooting preparation instruction) to generate a first shutter switch signal SW1 during operation of the shutter button 61. The system control unit 50 starts a shooting preparation operation such as auto focus (AF) processing, auto exposure (AE) processing, auto white balance (AWB) processing, and flash pre-light emission (EF) processing according to the first shutter switch signal SW1. The second shutter switch 64 is turned on through so-called full press (shooting instruction) at the time of completion of operation of the shutter button 61 to generate a second shutter switch signal SW2. The system control unit 50 starts a series of shooting processing operations from reading of a signal from the imaging unit 22 to writing of a captured image as an image file in the recording medium 200 according to the second shutter switch signal SW2.

The touch panel 70*a* and the display unit 28 can be integrally configured. For example, the touch panel 70*a* may be configured such that light transmissivity thereof does not hinder display of the display unit 28 and attached to an upper layer of a display surface of the display unit 28. Then, input coordinates in the touch panel 70*a* are associated with display coordinates on the display surface of the display unit 28. Accordingly, it is possible to provide a graphical user interface (GUI) as if the user can directly operate a screen displayed on the display unit 28.

The system control unit 50 can detect the following operations or states with respect to the touch panel 70*a*.

Newly touching the touch panel 70*a* with a finger or a pen that has not touched the touch panel 70*a*, that is, start of touch (hereinafter, referred to as touch-down).

A state in which the touch panel 70*a* is touched with a finger or a pen (hereinafter, referred to as touch-on).

Movement of a finger or a pen touching the touch panel 70*a* (hereinafter, referred to as touch-move).

Separation of a finger or a pen touching the touch panel 70*a* from the touch panel 70*a* (releasing), that is, end of touch (hereinafter, referred to as touch-up).

A state in which the touch panel 70*a* is not touched (hereinafter, referred to as touch-off).

When touch-down is detected, touch-on is also simultaneously detected. After touch-down, touch-on is continuously detected in general as long as touch-up is not detected. When touch-move is detected, touch-on is also simultaneously detected. Even when touch-on is detected, touch-move is not detected unless a touch position is moved. After touch-up of all touching fingers and pen is detected, the state becomes touch-off.

The system control unit 50 is notified of these operations/states and coordinates of a position on the touch panel 70*a* touched by a finger or a pen through an internal bus. Then, the system control unit 50 determines an operation (touch operation) performed on the touch panel 70*a* on the basis of the notified information. Touch-move can be determined for each vertical component/horizontal component on the touch panel 70*a* on the basis of change in position coordinates even in a movement direction of a finger or a pen moving on the touch panel 70*a*. When touch-move of at least a predetermined distance has been detected, it is assumed that execution of a sliding operation is determined. An operation of rapidly moving a finger by a certain degree of distance with the finger touching the touch panel 70*a* and releasing the finger is called flicking. In other words, flicking is an operation of rapidly tracing on the touch panel 70*a* while flicking it with a finger. When touch-move by at least a predetermined distance at at least a predetermined speed is detected and touch-up is detected in this state, it can be determined that flicking has been performed (it can be determined that flicking has been performed subsequently to a sliding operation). Further, a touch operation of simultaneously touching (multi-touching) a plurality of positions (e.g., two points) and approaching touch positions each other is called pinch-in, and a touch operation of separating touch positions from each other is called pinch-out. Pinch-in and pinch-out are collectively called a pinch operation (or simply pinch). The touch panel 70*a* may be any of various types of touch panels such as a resistance film type, a capacitance type, a surface acoustic wave type, an infrared type, an electromagnetic induction type, an image recognition type, and an optical sensor type. Although there are a type of detecting a touch from presence of contact on a touch panel and a type of detecting a touch from approach of a finger or a pen to a touch panel, any type may be employed.

Meanwhile, the digital camera 100 may be provided with an audio input unit (not shown) that transmits to the system control unit 50 an audio signal obtained from an embedded microphone or an audio input device connected through an audio input terminal. In this case, the system control unit 50 selects the input audio signal as necessary, performs analog-to-digital conversion on the input audio signal, and performs level optimization processing, specific frequency reduction processing, and the like to generate an audio signal.

In the present embodiment, a user can set a type of designating a position of a position index (e.g., AF frame) in a case where touch-move is performed in an eye proximity state to any of an absolute position designation type and a relative position designation type. The absolute position designation type is a type in which input coordinates in the touch panel 70*a* are associated with display coordinates on the display surface of the EVF 29. In the case of the absolute position designation type, when touch-down is performed on the touch panel 70*a*, the AF frame is set at a position associated with a touched position (position at which coordinates are input) (moving from a position before touch-down) even if touch-move is not performed. A position set through the absolute position designation type is not related to a position set before touch-down and becomes a position based on a touch-down position. In addition, when touch-move is performed after touch-down, the position of the AF frame also moves on the basis of a touch position after touch-move. The relative position designation type is a type in which input coordinates in the touch panel 70*a* are not associated with display coordinates on the display surface of the EVF 29. In the case of the relative position designation type, the position of the AF frame does not move from a position before touch-down in a state in which only touch-down is performed on the touch panel 70*a* and touch-move is not performed. When touch-move is performed after that, the position of the AF frame moves from the currently set position of the AF frame (position set before touch-down) by a distance corresponding to a movement amount of touch-move in a movement direction of touch-move irrespective of the position of touch-down.

Meanwhile, as an AF type (AF frame setting type), any of a plurality of AF types including "one-point AF" and "face+tracking priority AF" may be set. "One-point AF" is a type of designating, by a user, one position by one-point AF frame as a position at which AF will be performed. "Face+tracking priority AF" is a type of automatically set an AF position on the basis of automatic selection conditions when a user does not designate a tracking target. In automatic setting of an AF position, if the face of a person is detected from an LV image, the face is preferentially selected as an AF target object. When a plurality of faces of persons are detected, one face is selected according to priority such as a large face size, a face position close to the digital camera 100 (on a close side), a face position close to the center in an image, and a face of a person registered in advance and set as an AF target object. If a face of a person is not detected, an object other than a face is selected according to priority such as an object close to the digital camera 100 (on a close side), an object with high contrast, an object with high priority such as an animal or a vehicle, and a moving body and set as an AF target object. When a user designates an object that is a tracking target, the object that is the tracking target is set to an AF target object. That is, the automatic selection conditions are conditions that weighting is performed using at least one of element conditions as illustrated below as examples, a score obtained thereby is at least a predetermined threshold value or an obtained score is highest.

A face of a detected person.

The face size is large.

A face position is close to the digital camera 100 (on a close side).

A face position is close to the center in an image.

A face of a person registered in advance.

Close to the digital camera 100 (on a close side).

Contrast is high.

An object with high priority such as an animal or a vehicle.

A moving body.

Setting of AF Frame According to Line of Sight in One-Point AF

Control of movement of the AF frame using line-of-sight input in a case where an AF frame selection type (AF type) in the digital camera 100 is set to "one-point AF" will be described using FIGS. 3A to 3H. FIGS. 3A to 3H are display examples displayed on the EVF 29 in a case where the AF frame selection type (AF type) in the digital camera 100 is set to "one-point AF".

Figure 3A:
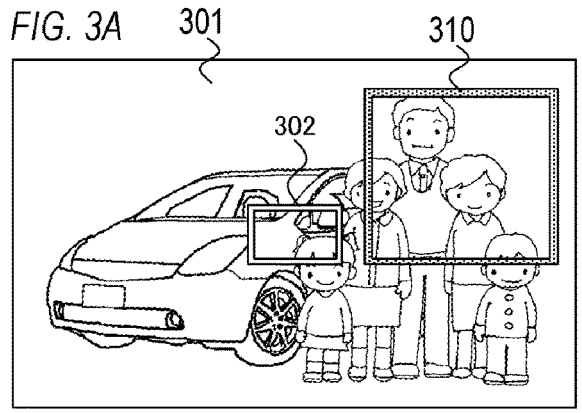
FIGS. 3A to 3H are diagrams describing setting of an AF frame according to a line of sight in one-point AF according to one embodiment.

FIG. 3A is a display example in a state in which a line-of-sight function (a function of designating an AF position using line-of-sight input) is set to be enabled and the line-of-sight detection unit 160 detects a line of sight of a user. A live view (hereinafter, LV) 301 is an LV image that is being captured by the imaging unit 22. A one-point AF frame 302 is an AF frame (an indicator indicating a position that is an AF target, that is, a focus adjustment position) in a case where the AF frame selection type (AF type) is set to "one-point AF". The one-point AF frame is set at the center of a screen in an initial state. A line-of-sight pointer 310 is a pointer (indicator, display item) indicating a position of line-of-sight input detected by the line-of-sight detection unit 160. While the line-of-sight detection unit 160 can acquire coordinates of a certain point as a position at which line-of-sight input is applied, the line-of-sight pointer 310 is displayed as an indicator indicating a range having a certain degree of a predetermined size having the position at which line-of-sight input is applied as a center. In doing so, a target object can be captured within the range indicated by the line-of-sight pointer even when a position at which line-of-sight input is detected is not exactly consistent with a target object position that the user wants to select. That is, an approximate position can be designated by line-of-sight input. In addition, the line-of-sight pointer 310 having a position obtained by averaging line-of-sight positions detected by the line-of-sight detection unit 160 for a predetermined period (e.g., a period of 30 milliseconds) as a center is displayed. In doing so, it is possible to prevent excessive movement of the line-of-sight pointer due to variation within a very short time at a position of line-of-sight input of the user and improve visibility of the line-of-sight pointer. A human line of sight has a characteristic that eyeballs finely move even when gazing a certain point, which is called fixational eye movement. Accordingly, when a user intends to designate an exact position using only line-of-sight input, it is difficult to designate a position as intended by the user and the user feels uncomfortable with the operation. This uncomfortable feeling can be reduced by displaying the line-of-sight pointer 310 in a first size that is large to a certain degree on the basis of a position averaged for a predetermined period.

Figure 3E:
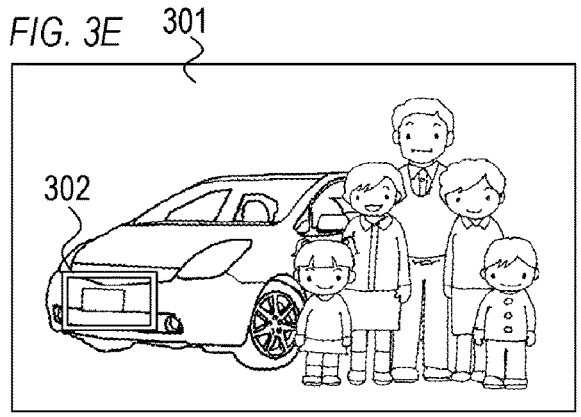
Figure 3B:
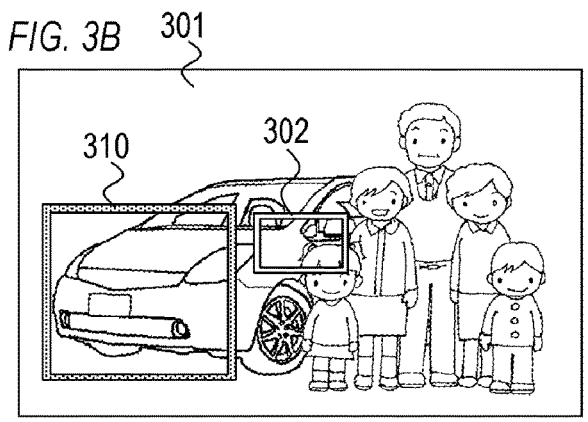

FIG. 3B is a display example in the EVF 29 in a case where the user moves the line of sight to change places that the user is viewing in the EVF 29 in the state of FIG. 3A. While the line-of-sight pointer 310 is present at the upper right of the screen in FIG. 3A, it moves to the lower left of the screen in FIG. 3B. In this manner, the position of the line-of-sight pointer 310 also moves in connection with movement of the line of sight of the user. Meanwhile, the one-point AF frame 302 does not move only by the movement of the line-of-sight pointer 310. That is, the positions of the one-point AF frame 302 in FIGS. 3A and 3B are identical.

Figure 3F:
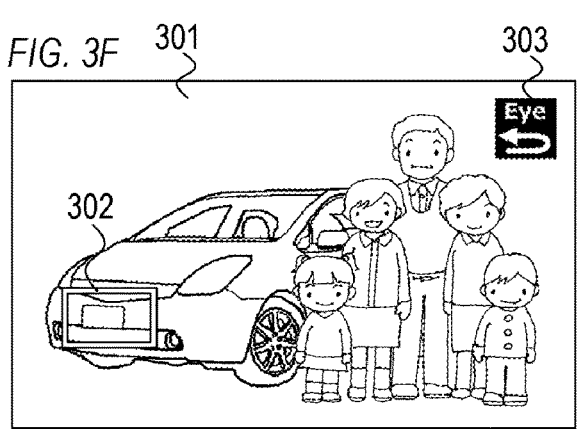
Figure 3C:
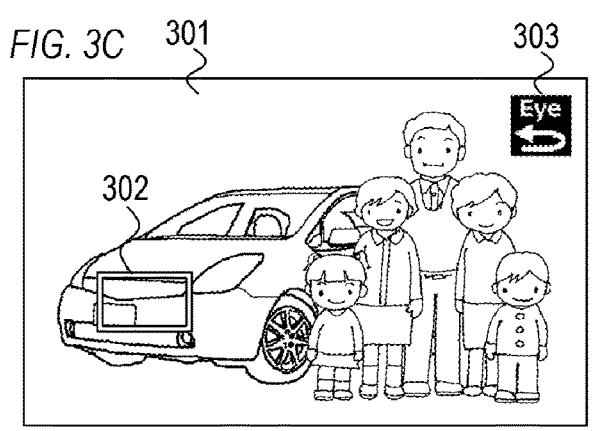

FIG. 3C is a display example in the EVF 29 in a case where the line-of-sight confirmation button 82 has been pressed in the state of FIG. 3B. When the line-of-sight confirmation button 82 is pressed in a state in which the line-of-sight pointer 310 is displayed, the one-point AF frame 302 is set at (moves to) a line-of-sight input position at that point in time (a position obtained by averaging positions detected by the line-of-sight detection unit 160 for a predetermined period). When the line-of-sight pointer 310 is not in contact with a screen edge, the line-of-sight pointer 310 is displayed in a range having the line-of-sight input position as a center, and thus the one-point AF frame is displayed at the center of the position at which there was the line-of-sight pointer 310. In addition, in a state in which designation of a position according to the line of sight is confirmed, the line-of-sight pointer 310 is not displayed. In this manner, a position at which AF will be performed can be moved on the basis of the position of line-of-sight input. An icon 303 indicates necessity to cancel a state in which designation of a position according to a line of sight is confirmed, and a cancelation operation method in a case where the AF frame is moved again on the basis of line-of-sight input. A character string "Eye" indicates the line-of-sight confirmation button 82 and represents that a confirmation state can be canceled by pressing the line-of-sight confirmation button 82. When the line-of-sight confirmation button 82 is pressed in the state of FIG. 3C, the confirmation state is canceled and the state returns to the display state of FIG. 3A or 3B.

Figure 3G:
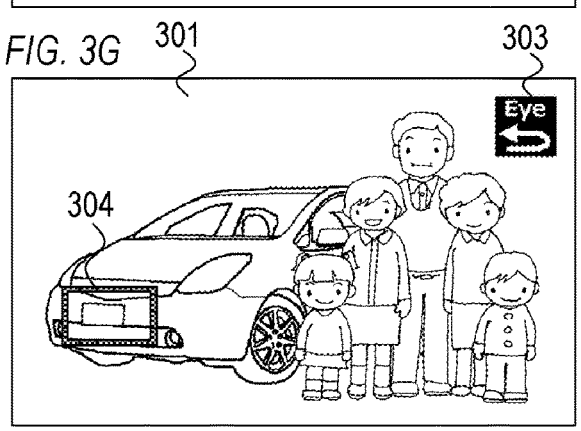
Figure 3D:
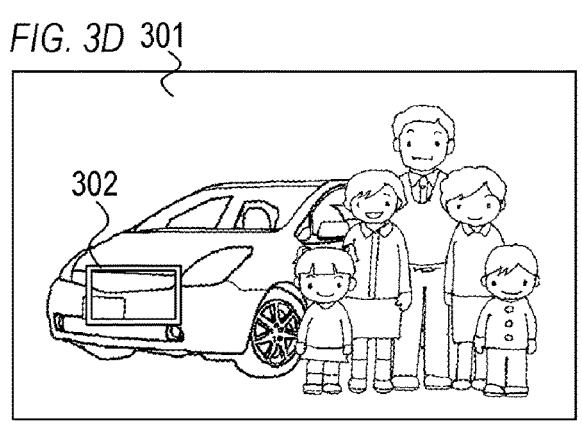

FIG. 3D is a display example in a case where touch-down performed on the touch panel 70a has been detected in the state of FIG. 3B. When touch-down is performed in a state in which the line-of-sight pointer 310 is displayed, the one-point AF frame 302 is set at (moves to) a line-of-sight input position at that point in time (a position obtained by averaging positions detected by the line-of-sight detection unit 160 for a predetermined period). Then, the state becomes a state in which the AF frame can be moved according to a touch & drag AF function (a state in which the AF frame is being moved according to the touch & drag AF function). The touch & drag AF function is a function of moving the AF frame displayed on the EVF 29 to a position different from the EVF 29 according to touch-move performed on the touch panel 70a. Since the user can correctly designate a desired position through a touch operation, if a pointer indicating a touch position (the one-point AF frame 302 in this example) is large, a precise position cannot be designated, which is troublesome. Accordingly, a large pointer such as the line-of-sight pointer 310 is not displayed and a position is designated by the one-point AF frame 302 smaller than the line-of-sight pointer 310.

FIG. 3E is a display example in a case where touch-move toward lower left applied to the touch panel 70a has been detected in the state of FIG. 3D and the one-point AF frame 302 has been moved to lower left in response to the detected touch-move according to relative position designation in the state of FIG. 3D.

FIG. 3F is a display example in a case where touch-up has been performed in the state of FIG. 3E. In a state in which movement of the one-point AF frame 302 according to touch & drag has ended, the icon 303 is displayed. In this manner, the position (selected position) of the AF frame can be designated according to a combination of line-of-sight input and a touch operation. Meanwhile, if touch-move is performed by additionally touching the touch panel 70a in the state of FIG. 3F or 3C, the one-point AF frame 302 can be further moved in response to touch-move.

In the above-described example, it is assumed that a position for which the user wants to adjust the focus is a number plate of a vehicle (object) included in the LV image 301. In this case, the one-point AF frame 302 can be set at the position of the number plate as follows. First, the front part of the vehicle is rapidly approximately designated with the line-of-sight pointer 310 by viewing the front part of the vehicle in the LV image 301, as illustrated in FIG. 3B. Thereafter, the position of the one-point AF frame 302 (the position of the one-point AF frame 302 in FIG. 3D) set on the basis of the line-of-sight pointer 310 is moved by a touch operation and finely adjusted such that it can precisely correspond to the position of the number plate. The movement amount of touch-move at this time is reduced because the one-point AF frame 302 has already been set near the number plate on the basis of line-of-sight input and the movement amount is a movement amount from here. In this manner, according to the present embodiment, the user can designate a desired position rapidly and accurately.

FIG. 3G is a display example in a case where an operation of the first shutter switch 62 (half pressing the shutter button 61) has been detected and AF has been executed at the position of the one-point AF frame 302 in the state of FIG. 3F. The one-point AF frame 302 switches to a focusing one-point AF frame 304 and a focused state is represented.

Figure 3H:
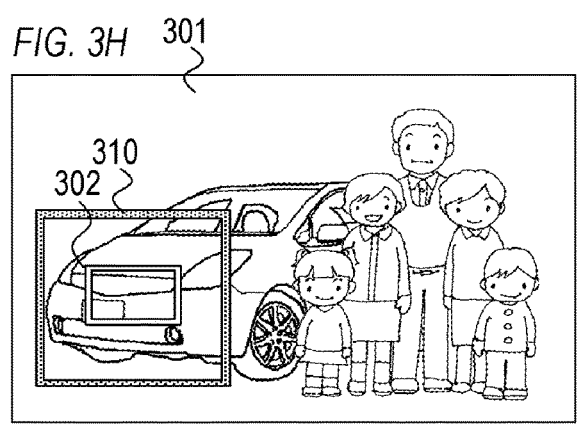

Meanwhile, although examples in which the line-of-sight pointer 310 is not displayed when line-of-sight confirmation is performed have been described, other embodiments of the present disclosure are not limited thereto. FIG. 3H illustrates an example in which the line-of-sight pointer 310 is displayed even after the one-point AF frame has been moved to the position of the line-of-sight pointer 310 by pressing the line-of-sight confirmation button 82. In doing so, it is possible to immediately reset the position of the one-point AF frame 302 by moving the line-of-sight pointer 310 and pressing the line-of-sight confirmation button 82 again even when the one-point AF frame 302 cannot be moved to an intended position by pressing the line-of-sight confirmation button 82.

Setting of AF Frame According to Line of Sight in Face+Tracking Priority AF

Control of movement of the AF frame using line-of-sight input in a case where the AF frame selection type (AF type) in the digital camera 100 is set to "face+tracking priority" will be described using FIGS. 4A to 4H. FIGS. 4A to 4H are display examples displayed on the EVF 29 in a case where the AF frame selection type (AF type) is set to "face+tracking priority".

Figure 4A:
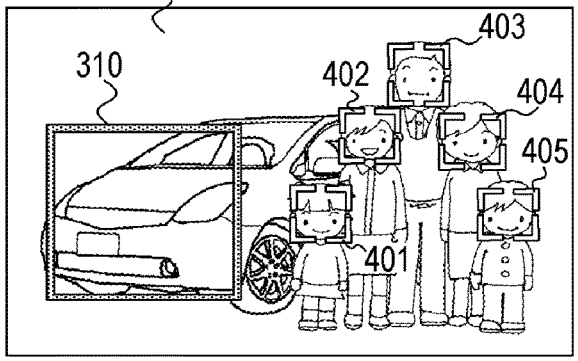
FIGS. 4A to 4H are diagrams describing setting of the AF frame according to a line of sight in face+tracking priority AF according to one embodiment.

FIG. 4A is a display example in a state in which the line-of-sight function is set to be enabled and the line-of-sight detection unit 160 detects a line of sight of a user. The same parts as those described in FIG. 3A are denoted by the same reference signs and description thereof is omitted. In face+tracking priority, the line-of-sight pointer 310 is displayed in the first size that is large to a certain degree on the basis of a position averaged for a predetermined period as in the case of the one-point AF. Face frames 401 to 405 are indicators indicating positions of faces of persons detected from the LV image. In the state of FIG. 4A, no face is selected.

Figure 4E:
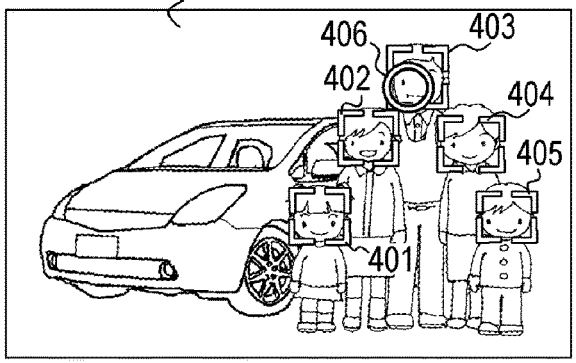
Figure 4B:
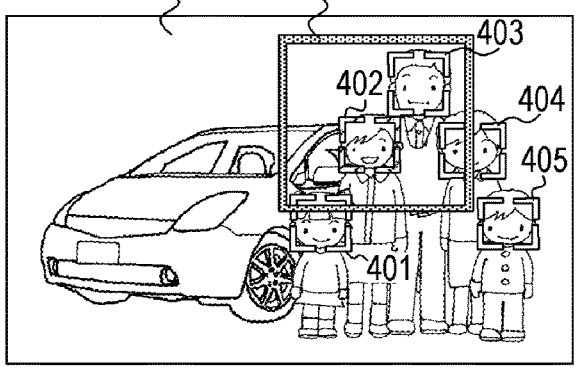

FIG. 4B is a display example in the EVF 29 in a case where a user moves a line of sight to change places that the user is viewing in the EVF 29 in the state of FIG. 4A. While the line-of-sight pointer 310 is present on the left side of the screen in FIG. 4A, it moves to the upper right of the screen in FIG. 4B.

Figure 4F:
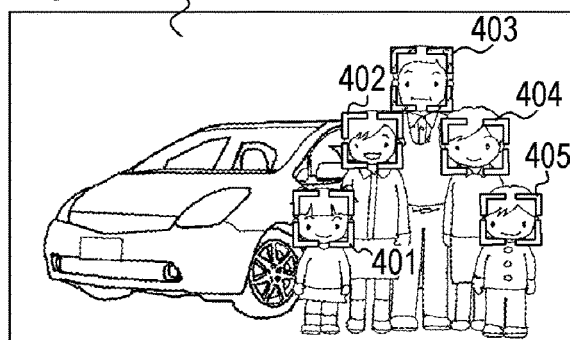
Figure 4C:
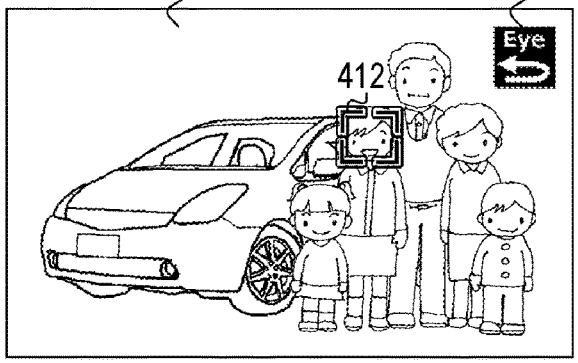

FIG. 4C is a display example in the EVF 29 in a case where the line-of-sight confirmation button 82 has been pressed in the state of FIG. 4B. When the line-of-sight confirmation button 82 is pressed in a state in which the line-of-sight pointer 310 is displayed, an object that is a tracking target (AF target) is automatically selected according to the above-described automatic selection conditions within a range indicated by the line-of-sight pointer 310 at that point in time. In the example of FIG. 4C, the face indicated by the face frame 402 which is a face on the closest side among faces (the face frames 402 and 403) entirely included in the line-of-sight pointer 310 illustrated in FIG. 4B is selected and set as a tracking target. A tracking frame 412 is displayed on the object that has become the tracking target and the face frame is not displayed. Then, tracking is started. During tracking, the tracking frame moves following the tracking target even when the object that is the tracking target moves. Since a zone in which an object is selected by the line-of-sight pointer 310 is narrowed, an object outside the line-of-sight pointer 310 is not selected and a face and a vehicle indicated by the face frame 401 or the face frame 405 are not selected. That is, as a tracking target is set in a range rapidly and roughly designated by the user using a line of sight, it is possible to select an object more matching with user's intention than that selected through automatic selection that does not use a line of sight. In addition, in FIG. 4C, in a state in which designation of a position according to a line of sight is confirmed, the line-of-sight pointer 310 is not displayed. When the line-of-sight confirmation button 82 is pressed in the state of FIG. 4C, the confirmation state is canceled and the state returns to the display state of FIG. 4A or 4B.

Figure 4G:
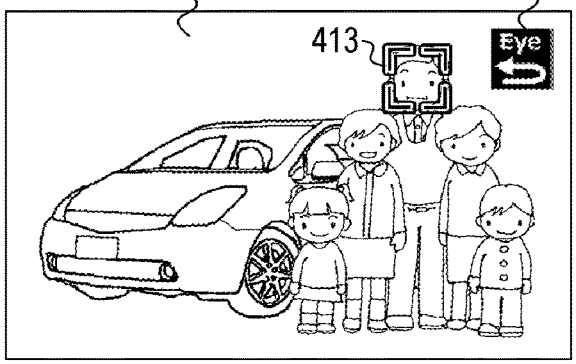
Figure 4D:
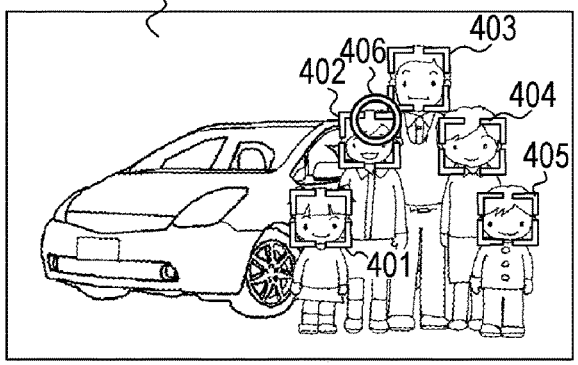

FIG. 4D is a display example in a case where touch-down performed on the touch panel 70a has been detected in the state of FIG. 4B. When touch-down is performed in a state in which the line-of-sight pointer 310 is displayed, a touch pointer 406 is displayed at a line-of-sight input position at that point in time (a position obtained by averaging positions detected by the line-of-sight detection unit 160 for a predetermined period). Then, the state changes to a state in which a position can be designated by the touch & drag AF function (a state in which the touch pointer 406 is being moved by the touch & drag AF function). Since the user can correctly designate a desired position through a touch operation, if a pointer indicating a touch position (the touch pointer 406 in this example) is large, a precise position cannot be designated, which is troublesome. Accordingly, a large pointer such as the line-of-sight pointer 310 is not displayed and a position is designated by the touch pointer 406 smaller than the line-of-sight pointer 310. Accordingly, the user easily selects a desired face even when faces are concentrated as illustrated.

FIG. 4E is a display example in a case where touch-move toward upper right applied to the touch panel 70a has been detected in the state of FIG. 4D and the touch pointer 406 has been moved to upper right in response to the detected touch-move according to relative position designation in the state of FIG. 4D. The touch pointer 406 is disposed at a position approximately corresponding to the position of the face frame 403 (more strictly, a position at which the center of the touch pointer 406 is included in the range of the face frame 403). When touch-up is performed in this state, the face frame 403 is designated as a tracking target on the basis of the position of the touch pointer 406. Meanwhile, in the changed display as illustrated in FIG. 4E, when the touch pointer 406 and face frames are in a positional relationship in which a face frame can be designated by the touch pointer 406 during movement of the touch pointer 406 before touch-up, display indicating a face designated when touch-up has been performed at that point in time (attachment display) may be performed.

FIG. 4F illustrates a display example of attachment display. The touch pointer 406 is moved in response to touch-move, and when the touch pointer 406 arrives at a position at which the face frame 403 can be designated, the touch pointer 406 is not displayed and the face frame 403 is displayed in a display form different from other face frames. In doing so, if the user performs touch-up at this point in time, the user can recognize that the face frame 403 is designated and easily determine whether touch-move has been performed to a target position.

FIG. 4G is a display example in a case where touch-up has been performed in the state of FIG. 4E or 4F. The face frame 403 is set as a tracking target on the basis of a position of the touch pointer 406 immediately before touch-up, a tracking frame 413 is displayed, and tracking is started. In a state in which movement of the touch pointer 406 according to touch & drag has ended, the icon 303 is displayed. Meanwhile, if touch-move is performed by additionally touching the touch panel 70a in the state of FIG. 4G or 4C, tracking is canceled and the touch pointer 406 is displayed at the position that was the tracking target, and thus the touch pointer 406 can be moved in response to touch-move.

In the above-described examples, it is assumed that a position for which the user wants to adjust the focus is the face indicated by the face frame 403 included in the LV image 301. In this case, a tracking target (AF position) can be set at the position of the face frame 403 as follows. First, a range is rapidly approximately designated by viewing a part near the face frame 403 in the LV image 301, as illustrated in FIG. 4B. Thereafter, the touch pointer 406 is moved by a touch operation from the position of the face frame 402 that is a tracking target set on the basis of the line-of-sight pointer 310 and finely adjusted such that the touch pointer 406 can precisely correspond to the face frame 403. The movement amount of touch-move at this time is reduced because the face frame 402 near the face frame 403 has already been set on the basis of line-of-sight input and the movement amount is a movement amount from here. In this manner, according to the present embodiment, the user can designate a desired position (object) rapidly and accurately.

Figure 4H:
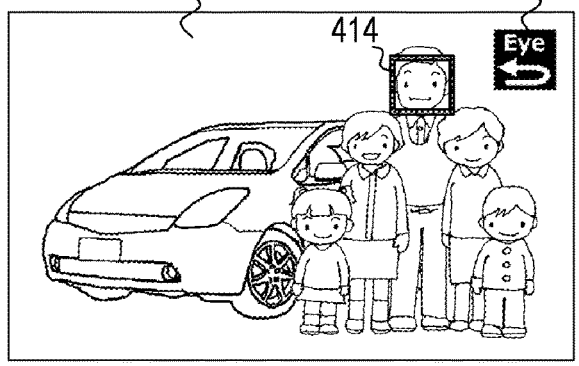

FIG. 4H is a display example in a case where an operation of the first shutter switch 62 (half pressing the shutter button 61) has been detected and AF has been executed at a position of the tracking frame in the states of FIGS. 4E to 4G. When the touch pointer 406 is disposed at a position of an object in a non-tracking state, the object is tracked and then AF is successively executed. A tracking frame and a face frame of attachment display switch to a focusing face frame 414 and focusing is represented. Meanwhile, when the same operation is performed in the states of FIGS. 4A and 4B in which the line-of-sight pointer 310 is displayed, an object near the center of the line-of-sight pointer 310 may be tracked and then AF may be successively executed.

Meanwhile, as in the case of the one-point AF, a configuration in which the line-of-sight pointer 310 is displayed even after an object at the position of the line-of-sight pointer 310 is tracked by pressing the line-of-sight confirmation button 82 or the touch pointer 406 is displayed by touch-move may be employed.

Shooting Mode Processing

Figure 5A:
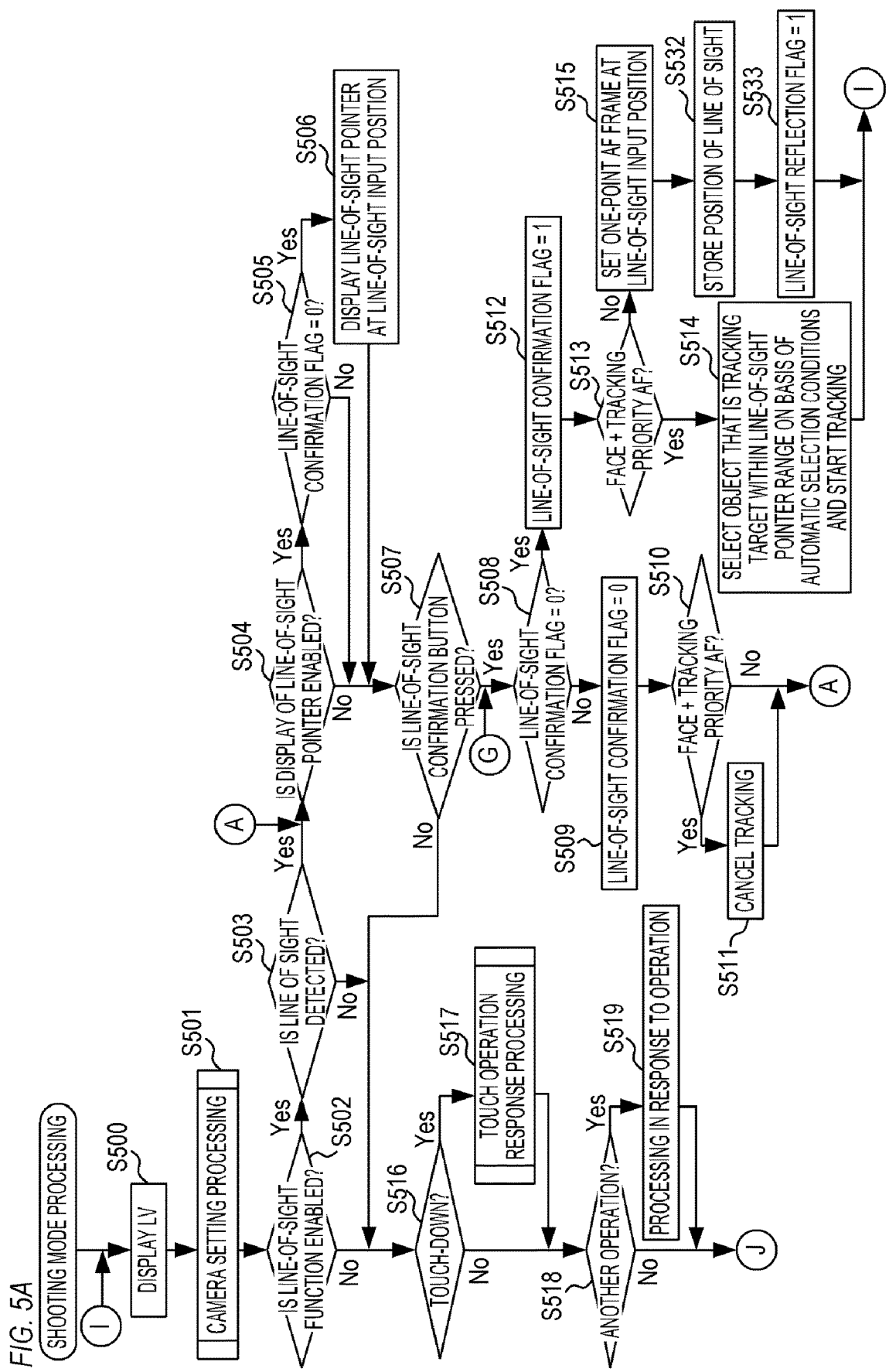
FIGS. 5A and 5B are flowcharts of imaging mode processing according to one embodiment.
Figure 5B:
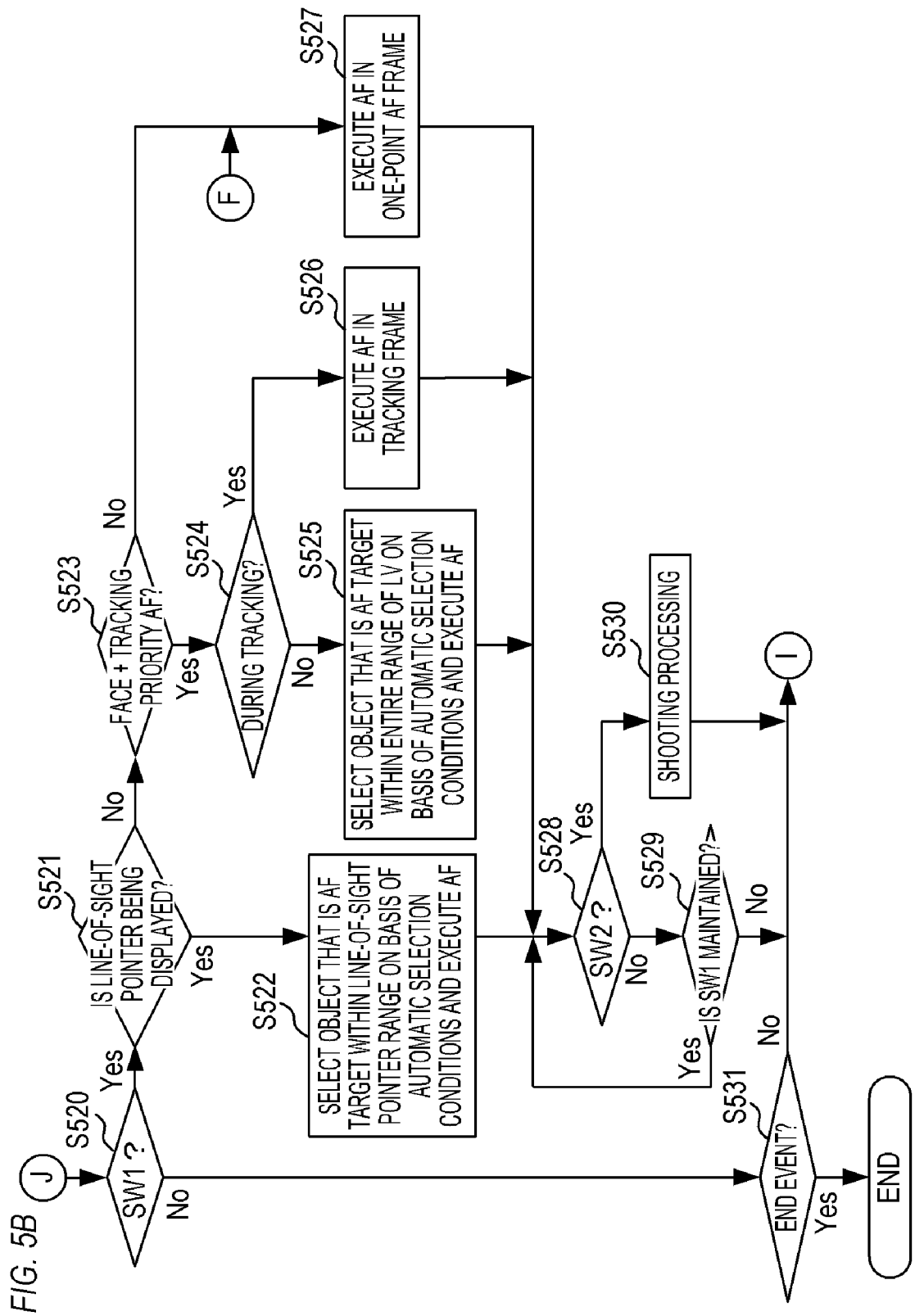

FIGS. 5A and 5B are flowcharts of shooting mode processing in the digital camera 100 in the present embodiment. Processing of FIGS. 5A and 5B is processing in a case where a display destination is the EVF 29. Accordingly, display of an indicator such as a one-point AF frame on the EVF 29 is included in specific conditions for performing CAL correction, which will be described in detail later. Each processing in flowcharts of FIGS. 5A to 10B is realized by the system control unit 50 developing a program stored in the nonvolatile memory 56 in the system memory 52 and executing the program. When the digital camera 100 is started in a shooting mode, flags and control variables are initialized and processing of FIGS. 5A and 5B begins.

In S500, the system control unit 50 starts to capture a live view image (LV image) in the imaging unit 22 and displays the captured LV image on the EVF 29.

In S501, the system control unit 50 performs camera setting processing for executing various settings with respect to imaging in response to a user operation. Camera setting processing will be described later using FIG. 6.

In S502, the system control unit 50 determines whether the line-of-sight function is enabled (whether setting of line-of-sight AF which will be described later is enabled). Processing proceeds to S503 if the line-of-sight function is enabled and proceeds to S516 if not (if it is disabled).

In S503, the system control unit 50 determines whether a line of sight is detected by the line-of-sight detection unit 160. Processing proceeds to S504 if a line of sight is detected and proceeds to S516 if not (if a line of sight is not detected although the line-of-sight function is enabled).

In S504, the system control unit 50 determines whether line-of-sight pointer display is enabled. Processing proceeds to S505 if the line-of-sight pointer display is enabled and proceeds to S507 if not (if it is disabled).

In S505, the system control unit 50 determines whether a line-of-sight confirmation flag stored in the system memory 52 is 0. An initial value is 0. Line-of-sight confirmation flag=0 represents a state in which the aforementioned line-of-sight confirmation state is canceled and the line-of-sight pointer can be moved by a line of sight. There is also a "coarse adjustment mode" in which an approximate position can be designated by a line of sight. On the other hand, line-of-sight confirmation flag=1 indicates the aforementioned line-of-sight confirmation state and a state in which a position cannot be designated by a line of sight after an approximate position has been designated by a line of sight. There is also a "fine adjustment mode" in which a position can be finely designated by touch-move. Processing proceeds to S506 if the line-of-sight flag is 0 and proceeds to S507 if not (if line-of-sight flag=1).

In S506, the system control unit 50 displays the line-of-sight pointer 310 on the EVF 29 on the basis of a line-of-sight input position detected by the line-of-sight detection unit 160. As described above, the line-of-sight pointer 310 has the first size that is large to a certain degree and is displayed on the basis of a position obtained by averaging line-of-sight input positions for a predetermined period. If an averaged line-of-sight detection position is not near the edge of the EVF 29, the line-of-sight pointer 310 is displayed in a range in the first size having the line-of-sight input position as a center. If the averaged line-of-sight detection position is near the edge of the EVF 29, the line-of-sight pointer 310 is displayed in a range in the first size in contact with the edge of a screen close to the line-of-sight input position. According to processing of S506, the above-described display as illustrated in FIG. 3A or 3B is performed if the AF type is set to one-point AF and the above-described display as illustrated in FIG. 4A or 4B is performed if the AF type is set to face+tracking priority.

In S507, the system control unit 50 determines whether the line-of-sight confirmation button 82 has been pressed (that is, whether an operation of instructing execution of position designation/designation cancelation according to a line of sight has been performed). Processing proceeds to S508 if the line-of-sight confirmation button 82 has been pressed and proceeds to S516 if not.

In S508, the system control unit 50 determines whether the line-of-sight confirmation flag stored in the system memory 52 is 0. Processing proceeds to S512 if line-of-sight confirmation flag=0 and proceeds to S509 if not (if line-of-sight confirmation flag=1).

In S509, the system control unit 50 sets the line-of-sight confirmation flag to 0. In addition, the system control unit 50 cancels the displayed icon 303 and returns the display state to display in a state in which confirmation of a line of sight has been canceled.

In S510, the system control unit 50 determines whether the currently set AF type is face+tracking priority AF. Processing proceeds to S511 in which tracking is canceled and then proceeds to S504 if the currently set AF type is face+tracking priority AF. Accordingly, transition to the display state of FIG. 4A or 4B occurs when the line-of-sight confirmation button 82 is pressed, for example, in a case where the aforementioned display of FIG. 4C or 4G has been performed. When it is determined that the currently set AF type is not face+tracking priority AF (that is, it is determined that the currently set AF type is one-point AF) in S510, processing proceeds to S504. Accordingly, transition to the display state of FIG. 3A or 3B occurs when the line-of-sight confirmation button 82 is pressed, for example, in a case where the aforementioned display of FIG. 3C or 3F has been performed.

In S512, the system control unit 50 sets the line-of-sight confirmation flag to 1. In addition, the system control unit 50 displays the icon 303 on the EVF 29 and displays a line-of-sight confirmation state.

In S513, the system control unit 50 determines whether the currently set AF type is face+tracking priority AF. Processing proceeds to S514 if the currently set AF type is face+tracking priority AF and proceeds to S515 if not (that is, if the currently set AF type is one-point AF).

In S514, an object that is a tracking target is selected on the basis of the aforementioned automatic selection conditions within a range in the first size indicated by the line-of-sight pointer 310 (within the same range even when the line-of-sight pointer 310 is not displayed). Then, a tracking frame is displayed on the selected object (tracking target) and tracking is started. Accordingly, transition of display as illustrated in FIGS. 4B to 4C may occur, for example.

In S515, the system control unit 50 sets the one-point AF frame 302 at a line-of-sight input position at a point in time when the line-of-sight confirmation button 82 is pressed (a position obtained by averaging positions detected by the line-of-sight detection unit 160 for a predetermined period). Accordingly, transition of display as illustrated in FIGS. 3B to 3C may occur, for example. Meanwhile, in the present embodiment, an example of setting the one-point AF frame at a line-of-sight input position detected by the line-of-sight detection unit 160 in the case of one-point AF has been described. However, embodiments of the present disclosure are not limited thereto and, even in the case of one-point AF, automatic selection based on the automatic selection conditions may be performed within the range of the line-of-sight pointer 310 and the one-point AF frame 302 may be set at a position of an automatically selected object as in the case of face+tracking priority AF.

In S532, the system control unit 50 stores the position at which the one-point AF frame is set, that is, the line-of-sight input position at the point in time when the line-of-sight confirmation button 82 has been pressed.

In S533, the system control unit 50 sets a line-of-sight reflection flag to 1. The line-of-sight reflection flag is a flag used to determine whether to perform processing which will be described using FIGS. 9A, 9B, 10A, and 10B (processing of correcting CAL data on the basis of touch-move). CAL data is data acquired by CAL (calibration; detailed CAL or CAL correction which will be described later) of line-of-sight input (input position based on a line of sight) and data for correcting an input position based on a line of sight.

In S516, the system control unit 50 determines whether touch-down has been performed on the touch panel 70a. Processing proceeds to S517 if touch-down has been performed and proceeds to S518 if not.

In S517, the system control unit 50 performs touch operation response processing in response to a touch operation performed on the touch panel 70a. Touch operation response processing will be described later using FIG. 7.

In S518, the system control unit 50 determines whether another operation has been performed on the operating unit 70. Processing proceeds to S519 if another operation has been performed and proceeds to S520 if not.

In S519, the system control unit 50 performs processing in response to another operation. For example, the system control unit can change various shooting parameters such as a shutter speed, an aperture value, and an exposure correction value or set recording image quality or a self-timer.

In S520, the system control unit 50 determines whether the first shutter switch 62 has been turned on to output the signal SW1, that is, whether the shutter button 61 has been half pressed and a shooting preparation instruction has been performed. Processing proceeds to S521 if SW1 has been output and proceeds to S531 if not.

In S521, the system control unit 50 determines whether the line-of-sight pointer 310 is being displayed, that is, whether the line-of-sight function is enabled, a line of sight is detected, display of the line-of-sight pointer is enabled, and line-of-sight confirmation flag=0. Processing proceeds to S522 if the line-of-sight pointer 310 is being displayed and proceeds to S523 if not. Meanwhile, in the changed determination of whether the line-of-sight pointer 310 is being displayed, it may be determined whether the line-of-sight function is enabled, a line of sight is detected, and line-of-sight confirmation flag=0. In this case, if the line-of-sight function is enabled, a line of sight is detected, and line-of-sight confirmation flag=0, processing proceeds to S522 even if display of the line-of-sight pointer is disabled (the line-of-sight pointer 310 is not displayed).

In S522, the system control unit 50 selects an object that is an AF target on the basis of the aforementioned automatic selection conditions within a range in the first size indicated by the line-of-sight pointer 310 (within the same range even if the line-of-sight pointer 310 is not displayed). This is the same processing as selection of the tracking target in S514. Then, AF is executed on the basis of the selected object (AF target, focus adjustment target). In the same manner, processing such as AE or AWB may be performed on the basis of the selected object. Meanwhile, when the AF type is one-point AF, an AF target is not selected on the basis of the automatic selection conditions, and a range of the one-point AF frame having a line-of-sight input position at that point in time as a center may be selected as an AF target.

In S523, the system control unit 50 determines whether the currently set AF type is face+tracking priority AF. Processing proceeds to S524 if the currently set AF type is face+tracking priority AF and proceeds to S527 if not (if the currently set AF type is one-point AF).

In S524, the system control unit 50 determines whether tracking of the object is performed. Processing proceeds to S526 if tracking is performed and proceeds to S525 if not.

In S525, the system control unit 50 selects an object that is an AF target for the entire range of an LV image that is being captured on the basis of the aforementioned automatic selection conditions. Then, the system control unit 50 executes AF on the basis of the selected object (AF target, focus adjustment target). In the same manner, processing such as AE or AWB may be performed on the basis of the selected object. Meanwhile, the selection target is not limited to the entire range of the LV image, and a range in a second size greater than the first size that is the size of the line-of-sight pointer 310 in the LV image may be used as a target. For example, a range of 80% (>first size) from the center of the LV image may be used as a range of a target of automatic selection of an object based on the automatic selection conditions in S525. In this case, other edge regions are assumed to be regions in which a main object on which AF needs to be performed is less likely to be present, and thus they are excluded from the target of automatic selection of an object based on the automatic selection conditions in S525.

In S526, the system control unit 50 executes AF in the tracking frame during tracking (i.e., for the tracking target). In the same manner, processing such as AE or AWB may be performed on the basis of the tracking target.

In S527, the system control unit 50 executes AF in he set one-point AF frame. In the same manner, processing such as AE or AWB may be performed on the basis of the one-point AF frame.

In S528, the system control unit 50 determines whether the second shutter switch 64 has been turned on to output the signal SW2, that is, whether the shutter button 61 has been full pressed and a shooting instruction has been performed. Processing proceeds to S530 if SW2 has been output and proceeds to S529 if not.

In S529, the system control unit 50 determines whether the on state of SW1 is maintained. Processing proceeds to S528 if the on state of SW1 is maintained and proceeds to S531 if not (if SW1 is off).

In S530, the system control unit 50 performs a series of shooting processes (the aforementioned shooting processing) from exposure to recording of a captured image in the recording medium 200 as an image file through the imaging unit 22.

In S531, it is determined whether a shooting mode end event (a power off operation, an instruction for transition to other operation modes such as the playback mode, or the like) has occurred. Processing returns to S500 and is repeated if the end event has not occurred and ends the shooting mode processing if the end event has occurred.

Camera Setting Processing

The aforementioned camera setting processing of S501 of FIG. 5A will be described. The camera setting processing is processing of performing settings with respect to each setting item in setting menu screens with respect to shooting displayed when the menu button 81 is pressed.

FIGS. 11A, 11B, and 11C illustrate display examples of setting menu screens with respect to shooting displayed on the EVF 29 or the display unit 28. A setting item 1101 included in a menu screen of FIG. 11A is an item for performing setting of an AF type. A setting item 1102 is an item for performing setting of touch & drag AF. A setting item 1103 is an item for performing setting related to the line-of-sight function. A setting item 1104 is an item for setting an operation in a case where an operation of pressing the center part of the MC 65 has been performed.

FIG. 11B is a display example of a detailed setting menu screen of line-of-sight AF for performing setting related to the line-of-sight function. This screen is displayed in a case where the setting item 1103 of FIG. 11A has been selected. Setting items 1105 to 1110 are display on the detailed setting menu screen of line-of-sight AF in FIG. 11B. The setting item 1105 is an item for setting the line-of-sight function to be enabled or disabled. The setting item 1106 is an item for setting display of the line-of-sight pointer to be enabled (displayed) or disabled (non-displayed). The setting item 1107 is an item for setting response (hereinafter, sensitivity) of display of the line-of-sight pointer with respect to detected line-of-sight information. The setting item 1108 is an item for setting a function of jumping the AF frame to a line-of-sight detection position when SW1 is turned on to be enabled or disabled. The setting item 1109 is an item for setting a CAL number which will be described later. A CAL number 1109*a*, a user character string 1109*b*, and an indication 1109*c* indicating whether CAL is completed are also displayed along with the setting item 1109. The indication 1109*c* indicating whether CAL is completed may switch from an indication indicating that CAL is unexecuted to an indication indicating that CAL is completed when CAL correction which will be described later has been performed and thus CAL data has been accumulated (updated) at least a predetermined number of times, that is, when CAL correction has been performed at least a predetermined number of times. The setting item 1110 is an item for transition to the screen of FIG. 11C.

FIG. 11C is a display example of a detailed setting menu screen of line-of-sight AF for performing setting/execution related to CAL. A setting item 1111 is an item for executing CAL. A setting item 1112 is an item for deleting CAL data. A setting item 1113 is an item for executing storage of CAL data in an SD card or the like or reading of CAL data from the SD card or the like. A setting item 1114 is an item for setting whether to execute CAL correction which will be described later.

Figure 6:
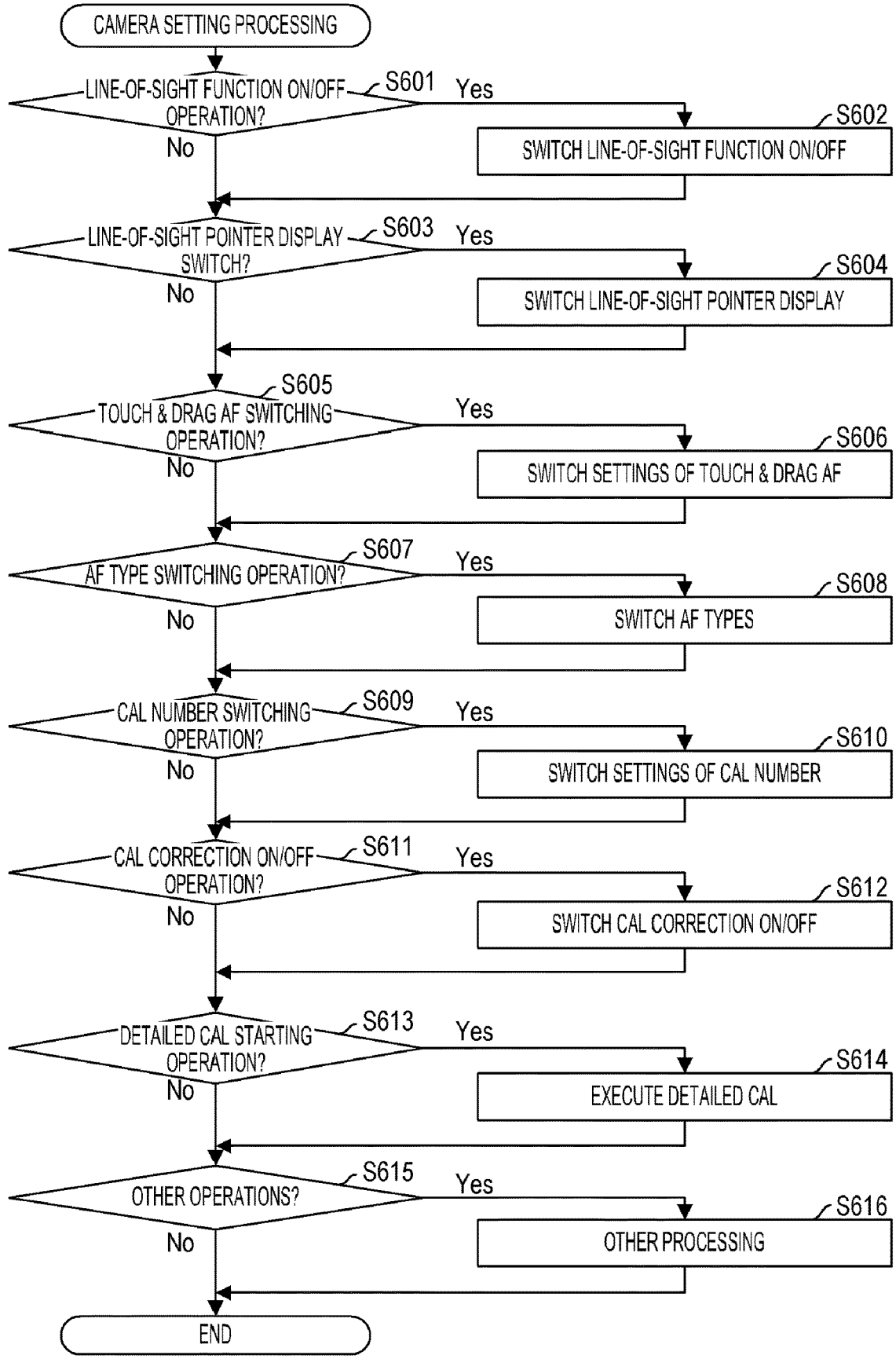
FIG. 6 is a flowchart of camera settings processing according to one embodiment.

FIG. 6 is a flowchart illustrating details of the aforementioned camera setting processing of S501 in FIG. 5A.

In S601, the system control unit 50 determines whether an operation of switching ON/OFF (enabling/disabling) of the line-of-sight function (line-of-sight AF) has been performed on the operating unit 70. The operation of switching ON/OFF (enabling/disabling) of the line-of-sight function is an operation of opening a menu screen, selecting a corresponding setting item (setting item 1105) and switching settings in the present embodiment. In the present embodiment, a function of inputting a line of sight of the user is enabled when line-of-sight AF is ON and the function is disabled when line-of-sight AF is OFF. Processing proceeds to S602 if the operation of switching ON/OFF of the line-of-sight function has been performed and proceeds to S603 if not.

In S602, the system control unit 50 switches ON/OFF of the line-of-sight function and records changed setting details in the nonvolatile memory 56.

In S603, the system control unit 50 determines whether an operation of switching ON/OFF (enabling/disabling) of display of the line-of-sight pointer has been performed on the operating unit 70. The operation of switching ON/OFF (enabling/disabling) of the line-of-sight confirmation function is an operation of opening the menu screen, selecting a corresponding setting item (setting item 1106) and switching settings in the present embodiment. In the present embodiment, the line-of-sight pointer 310 as a GUI is displayed in response to a line-of-sight input of the user when display of the line-of-sight pointer is ON and the line-of-sight pointer is not displayed when display of the line-of-sight pointer is OFF. Processing proceeds to S604 if the operation of switching ON/OFF of display of the line-of-sight pointer has been performed and proceeds to S605 if not.

In S604, the system control unit 50 switches ON/OFF (enabling/disabling) of display of the line-of-sight pointer and records changed setting details in the nonvolatile memory 56.

In S605, the system control unit 50 determines whether an operation of switching settings of the touch & drag AF function has been performed on the operating unit 70. The operation of switching settings of the touch & drag AF function is an operation of opening the menu screen, selecting a corresponding setting item (setting item 1102) and switching settings in the present embodiment. In the present embodiment, any of "absolute (the aforementioned absolute position designation type)" and "relative (the aforementioned relative position designation type)" may be selected as setting of touch & drag AF. Processing proceeds to S606 if the operation of switching the touch & drag AF function has been performed and proceeds to S607 if not.

In S606, the system control unit 50 switches settings of the touch & drag AF function and records changed setting details in the nonvolatile memory 56.

In S607, the system control unit 50 determines whether an operation of switching an AF type has been performed on the operating unit 70. The operation of switching an AF type is an operation of opening the menu screen, selecting a corresponding setting item (setting item 1101) and switching settings in the present embodiment. Processing proceeds to S608 if the operation of switching an AF type has been performed and the camera setting processing ends if not. Meanwhile, although examples in which any face+tracking priority AF and one-point AF can be selected as an AF type have been described in the present embodiment, other AF types (zone AF, multi-point AF, etc.) may be set.

In S608, the system control unit 50 switches an AF type and records changed setting details in the nonvolatile memory 56.

In S609, the system control unit 50 determines whether an operation of switching a CAL number has been performed on the operating unit 70. A CAL number is a number corresponding to each storage region when a plurality of regions in which CAL data is stored are secured. CAL numbers are useful when a plurality of users use the same electronic apparatus or one user wants to use an electronic apparatus in a plurality of forms, such as a state in which the user wears glasses and a naked-eye state. The operation of switching a CAL number is an operation of opening the menu screen, selecting a corresponding setting item (setting item 1109) and switching settings in the present embodiment. Processing proceeds to S610 if the operation of switching a CAL number has been performed and proceeds to S611 if not.

In S610, the system control unit 50 switches a CAL number setting and records changed setting details in the nonvolatile memory 56.

In S611, the system control unit 50 determines whether an operation of switching setting of whether to execute CAL correction has been performed on the operating unit 70. CAL correction is processing of correcting CAL data on the basis of a user operation, which will be described later. The operation of switching setting of CAL correction is an operation of opening the menu screen, selecting a corresponding setting item (setting item 1114) and switching setting in the present embodiment. Processing proceeds to S612 if the operation of switching setting of CAL correction has been performed and proceeds to S613 if not.

In S612, the system control unit 50 switches setting of CAL correction and records changed setting details in the nonvolatile memory 56.

In S613, the system control unit 50 determines whether an operation of executing CAL has been performed on the operating unit 70. Here, CAL is processing (detailed CAL) executed in a mode for generating CAL data of a user, which can generate detailed data, but arrangement is required therefor in general. The operation of executing detailed CAL is an operation of opening the menu screen and selecting a corresponding setting item (setting item 1111) in the present embodiment. Processing proceeds to S614 if the operation of executing detailed CAL has been performed and proceeds to S615 if not.

In S614, the system control unit 50 executes CAL and generates CAL data. The system control unit 50 associates the generated CAL data with a current CAL number and records the CAL data associated with the CAL number in the nonvolatile memory 56.

In S615, the system control unit 50 determines whether other operations have been performed on the operating unit 70. Processing proceeds to S616 if other operations have been performed, and the camera setting processing ends if not. Here, other operations may include, for example, an operation of switching settings of sensitivity of the line-of-sight pointer (setting of the setting item 1107), an operation of inputting a user character string (user character string 1109b) for identifying a CAL number, and the like.

In S616, the system control unit 50 executes other processing.

Touch Operation Response Processing

Figure 7:
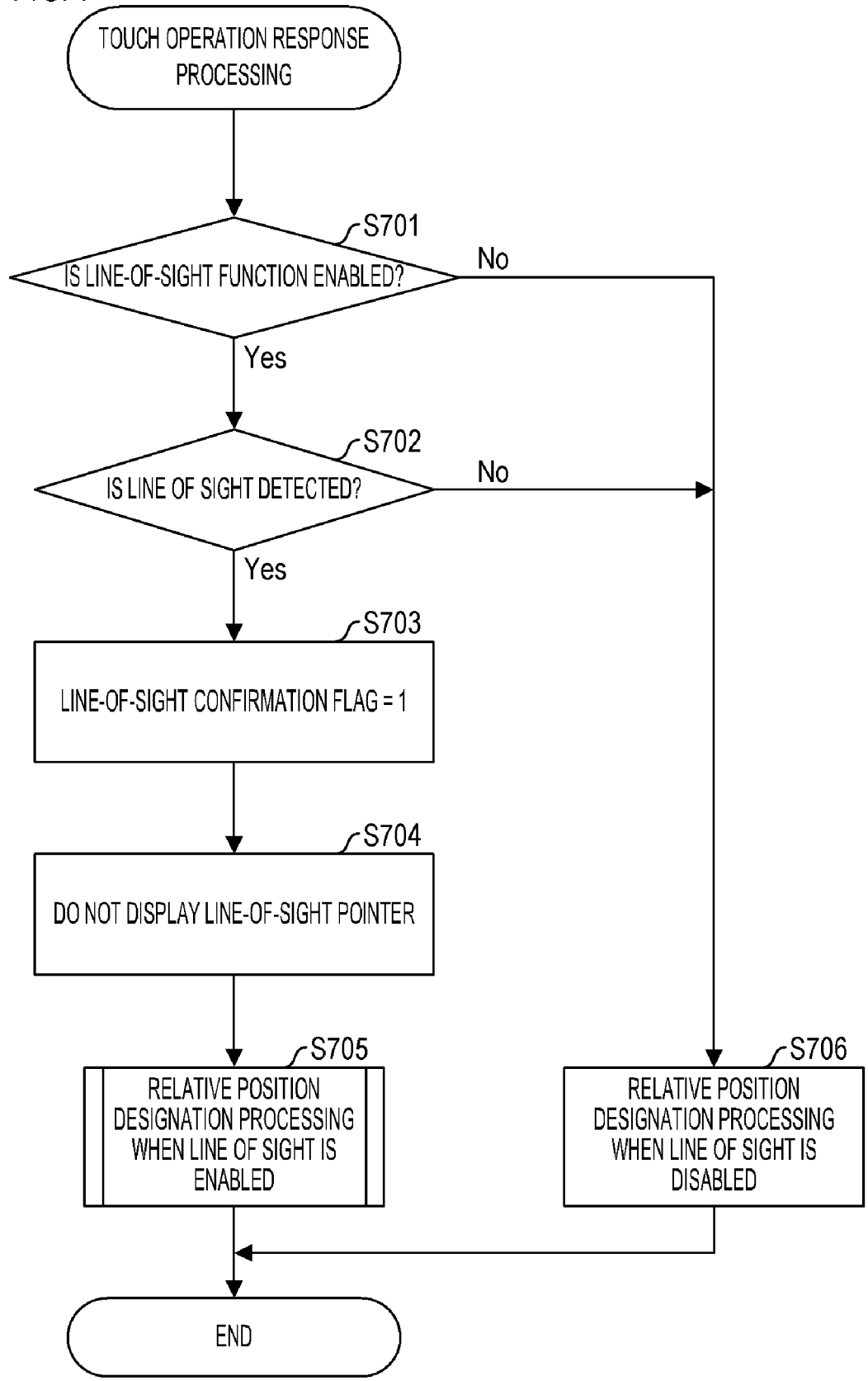
FIG. 7 is a flowchart of touch operation response processing according to one embodiment.

FIG. 7 is a detailed flowchart of the aforementioned touch operation response processing of S517 of FIG. 5A. Here, it is assumed that a position designation type in position input applied to the touch panel 70a is a relative position designation type. Accordingly, the fact that the position designation type is the relative position designation type is included in specific conditions for performing CAL correction, which will be described in detail later.

In S701, the system control unit 50 determines whether the line-of-sight function is enabled as in S502. Processing proceeds to S702 if the line-of-sight function is enabled and proceeds to S706 if not (if the line-of-sight function is disabled).

In S702, the system control unit 50 determines whether a line of sight is detected as in S503. Processing proceeds to S703 if a line of sight is detected and proceeds to S708 if not.

In S703, the system control unit 50 sets the line-of-sight setting flag to 1.

In S704, the system control unit 50 controls the line-of-sight pointer such that it is not displayed.

In S705, the system control unit 50 performs relative position designation processing when the line-of-sight function is enabled. This processing will be described later using FIG. 8.

In S706, the system control unit 50 performs relative position designation processing when the line-of-sight function is disabled.

Relative Position Designation Processing When Line of Sight is Enabled

Figure 8:
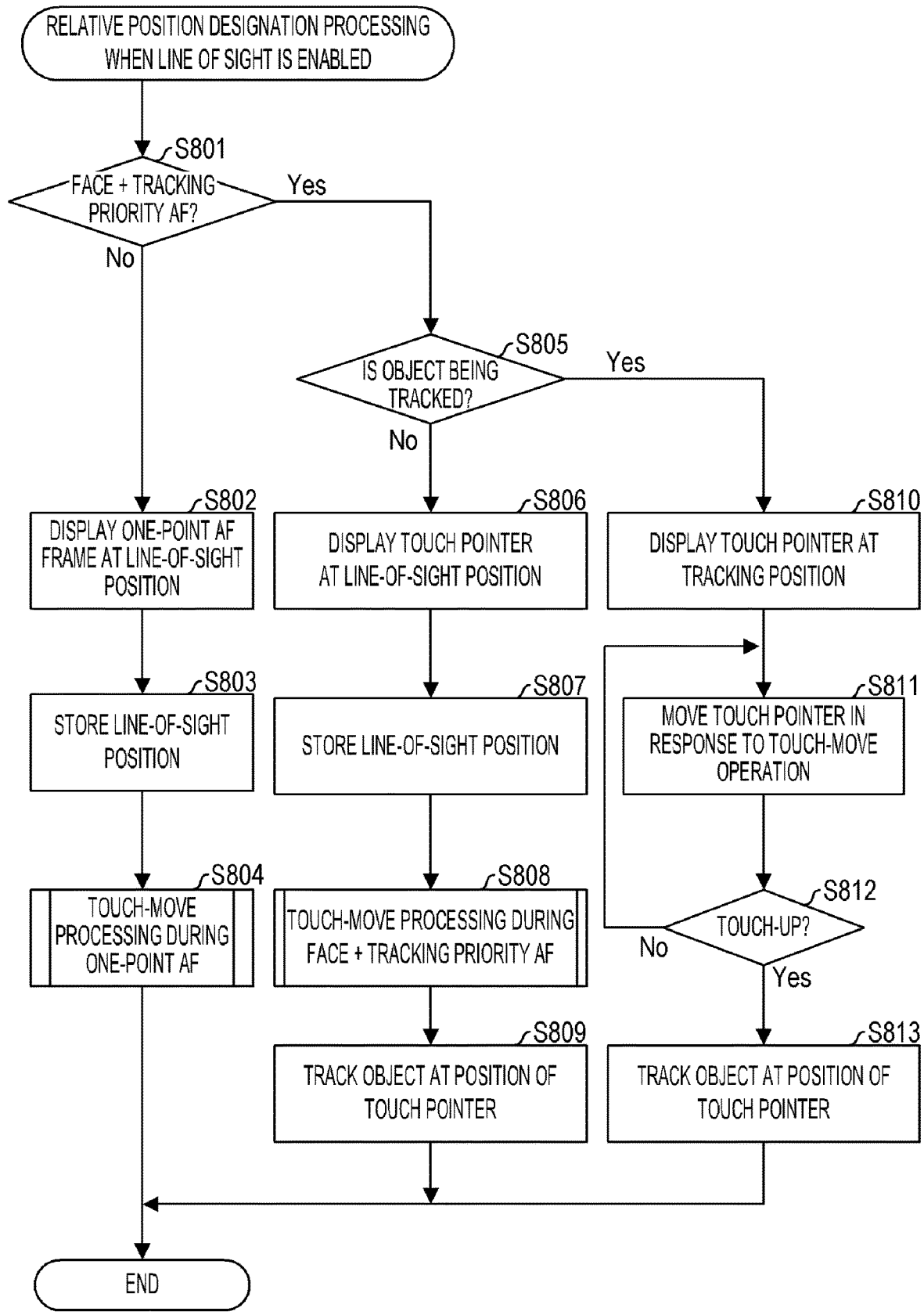
FIG. 8 is a flowchart of relative position designation processing when a line of sight is enabled according to one embodiment.

FIG. 8 is a detailed flowchart of the aforementioned relative position designation processing when a line of sight is enabled in S705 of FIG. 7.

In S801, the system control unit 50 determines whether an AF type is "face+tracking priority AF". Processing proceeds to S805 if the AF type is "face+tracking priority AF" and proceeds to S802 if not (if the AF type is "one-point AF" in the present embodiment).

In S802, the system control unit 50 displays a one-point AF frame at a line-of-sight input position at a point in time when touch-down has been performed (a position obtained by averaging positions detected by the line-of-sight detection unit 160 for a predetermined period). Accordingly, transition from the aforementioned display of FIG. 3B to the display of FIG. 3D occurs.

In S803, the system control unit 50 stores the position of the current line of sight. Meanwhile, when the processes of S515, S532, and S533 of FIG. 5A are performed, the processes of S802 and S803 may be omitted. The processes of S802 and S803 may be performed and the position of the position of the one-point AF frame and the stored line-of-sight position may be updated from the processing results of S515 and S532 to the processing results of S802 and S803.

In S804, the system control unit 50 performs touch-move processing during one-point AF in response to touch-move performed on the touch panel 70a. The touch-move processing during one-point AF will be described later using FIGS. 9A and 9B.

In S805, the system control unit 50 determines whether an object is being tracked. Processing proceeds to S810 if the object is being tracked and proceeds to S806 if not.

In S806, the system control unit 50 displays the touch pointer 406 indicating a touch position at a line-of-sight input position at a point in time when touch-down has been performed (a position obtained by averaging positions detected by the line-of-sight detection unit 160 for a predetermined period). Accordingly, transition from the display of FIG. 4B to the display of FIG. 4D may occur, for example.

In S807, the system control unit 50 stores the position of the current line of sight.

In S808, the system control unit 50 performs touch-move processing during face+tracking priority AF in response to touch-move performed on the touch panel 70a. The touch-move processing during face+tracking priority AF will be described later using FIGS. 10A and 10B.

In S809, the system control unit 50 selects an object at the position of the touch pointer and starts tracking of the object. In this case, selection is not based on the aforementioned automatic selection conditions. In addition, the icon 303 is displayed. Accordingly, display transition such as FIGS. 4E to 4G may occur, for example.

In S810, the system control unit 50 displays the touch pointer 406 indicating a touch position at a position of a tracking target at a point in time when touch-down has been performed. Accordingly, transition from the display of FIG. 4C to the display of FIG. 4D may occur, for example.

In S811, the system control unit 50 moves the touch pointer 406 indicating the touch position in response to touch-move (movement instruction operation) performed on the touch panel 70a. This movement is movement according to the relative position designation type. Accordingly, transition from the display of FIG. 4D to the display of FIG. 4E may occur, for example. The system control unit 50 may recognize that the display position of the touch pointer 406 moves in response to touch-move independently of line-of-sight input after the touch pointer 406 is displayed.

In S812, the system control unit 50 determines whether touch-up from the touch panel 70a has been performed. Processing proceeds to S813 if touch-up has been performed and returns to S811 if not.

S813 is the same as S809.

Meanwhile, in the present embodiment, an example of displaying the touch pointer 406 at a tracking position instead of a line-of-sight input position if tracking is being performed in a case where touch-down has been performed when a line of sight is enabled has been described. However, embodiments of the present disclosure are not limited thereto, and the touch pointer 406 may be displayed at a line-of-sight input position (a position obtained by averaging positions detected by the line-of-sight detection unit 160 for a predetermined period) when touch-down has been performed irrespective of whether tracking is being performed if a line of sight is enabled. In this case, processing proceeds to S806 without performing the determination of S805 when the determination result is "Yes" in S801.

In addition, when object tracking according to touch-up is performed through the relative position designation type (S809, S813, and the like), object tracking may be started after the lapse of a predetermined time from the touch-up. Accordingly, when the touch pointer is moved while a series of operations of touch-down, touch-move, and touch-up are repeated in the case of the relative position designation type, the touch pointer is easily moved because object tracking processing is not performed every time.

Touch-Move Processing during One-Point AF

Figure 9A:
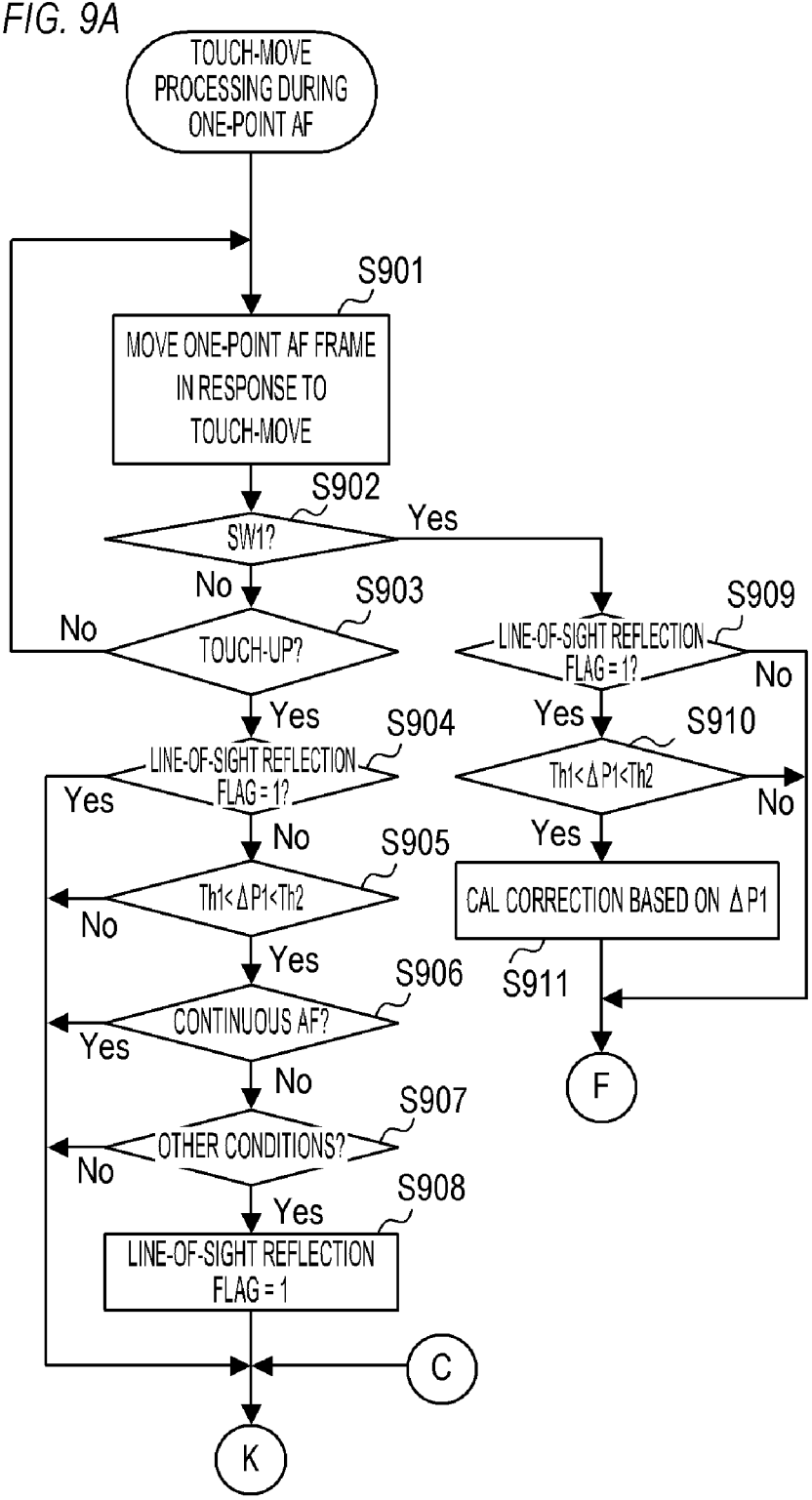
FIGS. 9A and 9B are flowcharts of touch-move processing during one-point AF according to one embodiment.
Figure 9B:
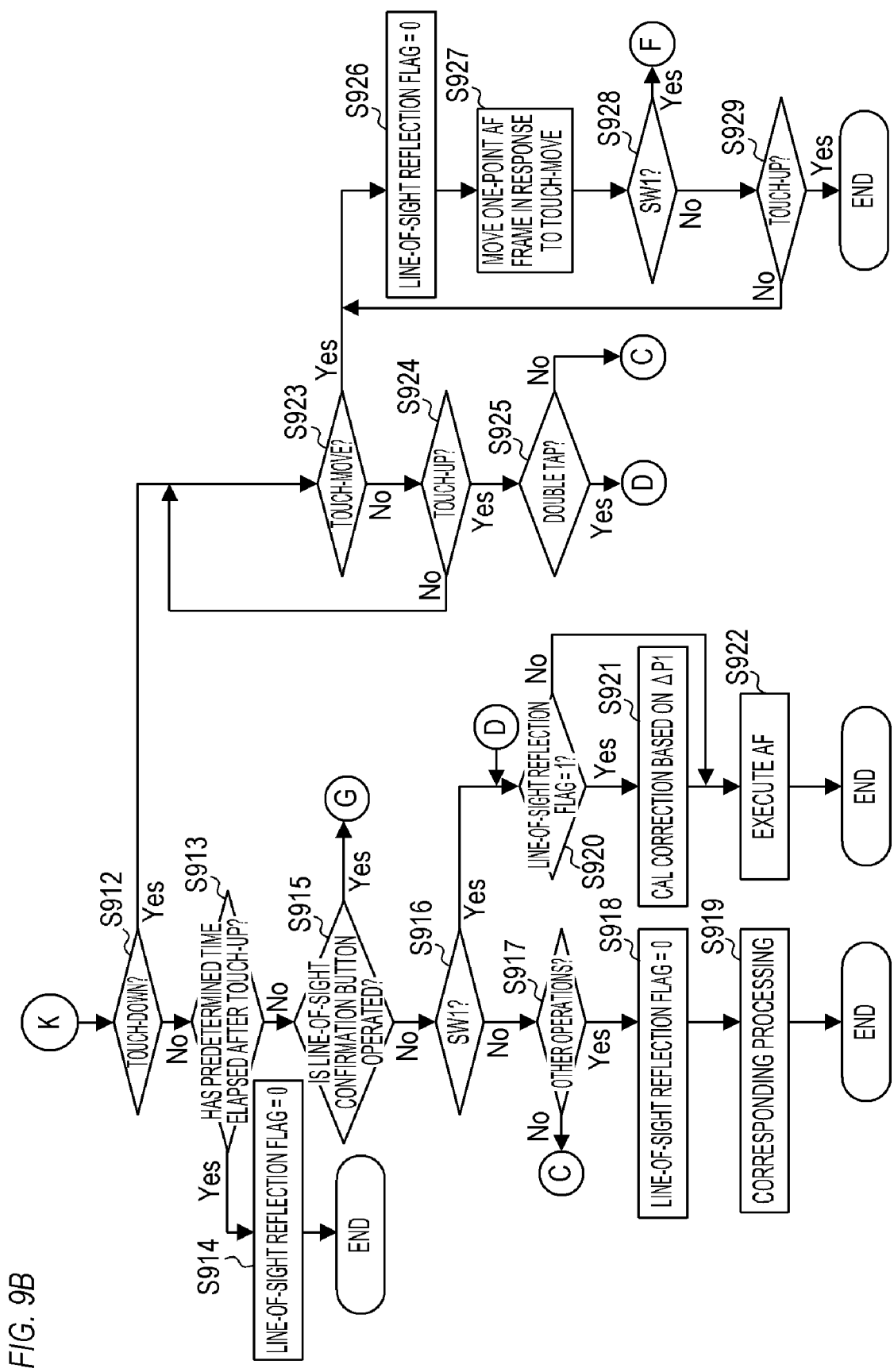

FIGS. 9A and 9B are detailed flowcharts of the aforementioned touch-move processing during one-point AF in S804 of FIG. 8.

In S901, the system control unit 50 moves a one-point AF frame in response to touch-move (movement instruction operation) performed on the touch panel 70a.

In S902, the system control unit 50 determines whether the first shutter switch 62 is turned on to output the signal SW1. Processing proceeds to S909 if SW1 has been output and proceeds to S903 if not.

In S903, the system control unit 50 determines whether touch-up from the touch panel 70a has been performed. Processing proceeds to S904 if touch-up has been performed and proceeds to S901 if not.

In S904, the system control unit 50 determines whether the line-of-sight reflection flag is set to 1. Processing proceeds to S912 if line-of-sight reflection flag=1 and proceeds to S905 if not.

In S905, the system control unit 50 determines whether the shortest distance ($\Delta P1$) from a stored line-of-sight position to the current position of the one-point AF frame moved in S901 is greater than a first threshold value (Th1) and less than a second threshold value (Th2). Processing proceeds to S906 if Th1<$\Delta P1$<Th2 and proceeds to S912 if not. When $\Delta P1$ is less than Th1, the accuracy of the stored line-of-sight position is sufficiently high and the user hardly needs to correct the position of the one-point AF frame according to touch-move. In addition, when $\Delta P1$ is greater than Th2, this can be conceived as a case in which the user wanted to move the position of the one-point AF frame to a great extent according to touch-move irrespective of the accuracy of the stored line-of-sight position. Accordingly, it is assumed that CAL correction which will be described later is not performed if $\Delta P1$ does not have a value that satisfies Th1<$\Delta P1$<Th2. Meanwhile, although calculation of a difference between the stored line-of-sight position and the position of the center of the one-point AF frame as ΔP1 is assumed, embodiments of the present disclosure are not limited thereto. A method of determining ΔP1 may be freely changed to a method such as using the position of a specific object detected within the one-point AF frame as a reference point.

In S906, the system control unit 50 determines whether continuous AF (a mode in which AF is executed all the time at a position of an AF frame) is enabled. Processing proceeds to S912 in the case of this mode and proceeds to S907 if not.

In S907, the system control unit 50 determines whether other conditions are satisfied. Processing proceeds to S908 if the other conditions are satisfied and proceeds to S912 if not. The other conditions may include, for example, at least any of a plurality of conditions below.

Each touch-move indicates the same direction when at least one touch-move is performed before touch-move in S901 (because it is considered that deviation of the line-of-sight position has been intended to be corrected to a fixed direction in this case).

A plurality of position inputs are not applied to the touch panel 70a, that is, at least two touch positions are not detected (because the nose of the user is likely to touch the touch panel 70a when the user looks in the EVF and thus erroneous ΔP1 is likely to be calculated on the basis of the position of the nose).

A longitudinal component of ΔP1 is at least a predetermined value (because the EVF of the digital camera is laterally long and, when normal CAL (detailed CAL) is executed, as CAL data, data with relatively high lateral reliability is obtained).

When the condition that at least two touch positions are not detected is excluded from the conditions, and a plurality of position inputs are applied to the touch panel 70a, the latest position input may be handled as a position designated through touch-move. That is, ΔP1 may be calculated on the basis of the latest touch position at a point in time when at least two touch positions have been detected.

In S908, the system control unit 50 sets the line-of-sight reflection flag to 1 because it can determine that CAL data correction based on touch-move will be performed from the conditions in S902 to S907.

In S909, the system control unit 50 determines whether the line-of-sight reflection flag has been set to 1. Processing proceeds to S910 if line-of-sight reflection flag=1 and proceeds to S527 if not.

In S910, the system control unit 50 determines whether Th1<ΔP1<Th2 is satisfied. Processing proceeds to S911 if it is satisfied and proceeds to S527 if not.

In S911, the system control unit 50 performs CAL correction based on ΔP1. By repeating this CAL correction, the accuracy of line-of-sight input is gradually improved. As described above, since data with relatively high lateral reliability is obtained as CAL data when normal CAL (detailed CAL) is executed, CAL correction may be performed only on the basis of the longitudinal component (component in the longitudinal direction) of ΔP1.

In S912, the system control unit 50 determines whether touch-down has been performed on the touch panel 70a. Processing proceeds to S923 if touch-down has been performed and proceeds to S913 if not.

In S913, the system control unit 50 determines whether a predetermined time has elapsed from touch-up in S903. Processing proceeds to S914 if the predetermined time has elapsed and proceeds to S915 if not.

In S914, the system control unit 50 assumes that the user has not performed a completion operation of expressing that a frame movement operation is completed at the current position of the one-point AF frame within the predetermined time from touch-up in S903 and sets the line-of-sight reflection flag to 0 such that the user does not perform CAL correction.

In S915, the system control unit 50 determines whether the line-of-sight confirmation button 82 has been pressed. Processing proceeds to S508 and the one-point AF frame is moved to the position of the current line of sight if the line-of-sight confirmation button 82 has been pressed. Processing proceeds to S916 if not.

In S916, the system control unit 50 determines whether the first shutter switch 62 is turned on to output the signal SW1. Processing proceeds to S920 if SW1 has been output and proceeds to S917 if not. Here, since the fact that the first shutter switch 62 is turned on may be considered as completion of the frame movement operation of the user at the current position of the one-point AF frame, processing proceeds to processing including CAL correction based on ΔP1 in S920 to S922.

In S917, the system control unit 50 determines whether other operations have been performed on the operating unit 70. Processing proceeds to S918 if other operations have been performed and proceeds to S912 if not. Here, other operations may include, for example, an operation of ending a live view shooting state such as pressing the menu button 81.

In S918, the system control unit 50 sets the line-of-sight reflection flag to 0 to set a state in which CAL correction is not performed.

In S919, the system control unit 50 performs corresponding processing based on other operations.

In S920, the system control unit 50 determines whether the line-of-sight reflection flag has been set to 1. Processing proceeds to S921 if line-of-sight reflection flag=1 and proceeds to S922 if not.

In S921, the system control unit 50 performs CAL correction based on ΔP1.

In S922, the system control unit 50 executes AF at the position of the one-point AF frame on the basis of the operation of the first shutter switch 62 in S916. Accordingly, transition of the display of FIG. 3F to the display of FIG. 3G may occur, for example.

Meanwhile, although the configuration in which CAL correction is performed on the assumption that the one-point AF frame movement operation is completed according to the operation of the first shutter switch 62 has been described, an operating member for a completion operation for instructing completion of frame movement is not limited to the first shutter switch 62. For example, a pressing operation for a pressure sensitive touch panel or a member (smart controller) having a touch detection member on the surface of a button that can be pressed may be used as the aforementioned completion operation.

In addition, an example in which CAL correction and AF at the position of the one-point AF frame are simultaneously performed has been described, embodiments of the present disclosure are not limited thereto. AF may not be executed or an operation of selecting an object present at the position of the one-point AF frame (or a pointer similar thereto) may be performed. An operation of inserting an object (characters or the like) at the position of a pointer may be performed.

Furthermore, when CAL correction is performed, the system control unit 50 may display a guide for indicating whether to perform CAL correction on the EVF 29 and switch execution/non-execution of CAL correction depending on a response thereto from the user. The guide may be displayed at a timing at which an operation with respect to shooting is not performed such that shooting is not obstructed.

In S923, the system control unit 50 determines whether touch-move has been performed on the touch panel 70a. Processing proceeds to S926 if touch-move has been performed and proceeds to S924 if not.

In S924, the system control unit 50 determines whether touch-up from the touch panel 70a has been performed. Processing proceeds to S925 if touch-up has been performed and proceeds to S923 if not.

In S925, the system control unit 50 determines whether the operation until the touch-up in S924 is a double tap. Processing proceeds to S920 if the operation is a double tap and proceeds to S912 if not. An operation of applying a touch to the touch panel 70a and separating the touch without touch-move is a tap, and a series of operations of performing a tap and performing a tap again within a predetermined time is the double tap.

In S926, the system control unit 50 sets the line-of-sight reflection flag to 0 because a case in which touch-move has been performed multiple times can be considered as a case in which a frame movement operation of the user is not completed yet or the user wants to move the one-point AF frame from the line-of-sight position to a great extent.

In S927, the system control unit 50 moves the one-point AF frame in response to touch-move (movement instruction operation) performed on the touch panel 70a.

In S928, the system control unit 50 determines whether the first shutter switch 62 is turned on to output the signal SW1. Processing proceeds to S527 and AF is executed at the current position of the one-point AF frame if SW1 has been output. Processing proceeds to S929 if not.

In S929, the system control unit 50 determines whether touch-up from the touch panel 70a has been performed. The touch-move processing during one-point AF ends if touch-up has been performed and proceeds to S926 if not.

Touch-Move Processing During Face+Tracking Priority AF

Figure 10A:
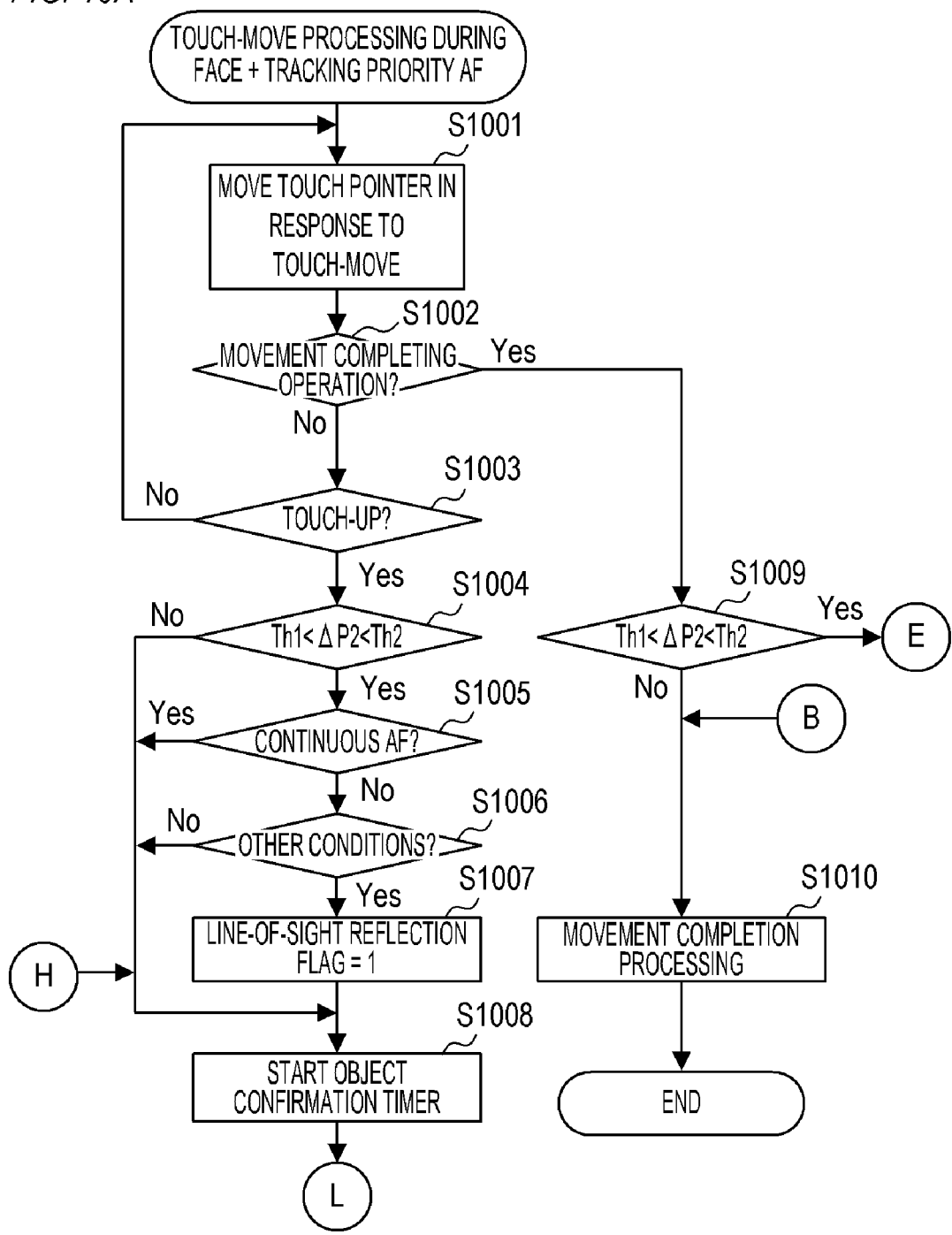
FIGS. 10A and 10B are flowcharts of touch-move processing during face+tracking priority AF according to one embodiment.
Figure 10B:
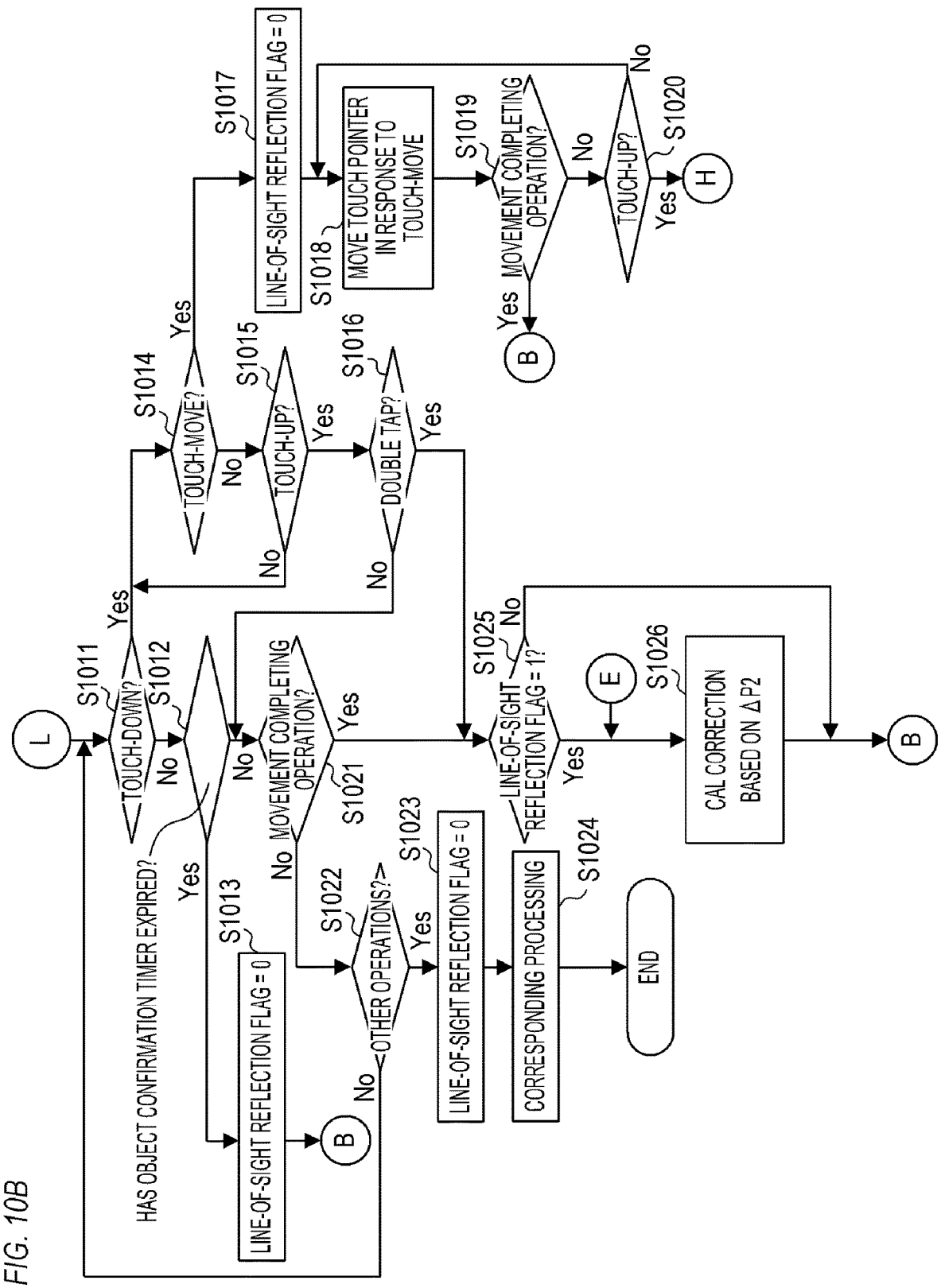

FIGS. 10A and 10B are detailed flowcharts of the aforementioned touch-move processing during face+tracking priority AF in S808 of FIG. 8.

In S1001, the system control unit 50 moves the touch pointer 406 in response to touch-move (movement instruction operation) performed on the touch panel 70a.

In S1002, the system control unit 50 determines whether an operation of completing the operation of moving the touch pointer 406 has been performed. The process of S1002 corresponds to the process of S916 of FIG. 9B. The operation of completing the movement operation may be, for example, an operation of executing AF along with completion of movement by pressing the first shutter switch 62, an operation of pressing a touch operating member that can detect a pressing operation, or the like. Processing proceeds to S1009 if the completing operation has been performed and proceeds to S1003 if not.

In S1003, the system control unit 50 determines whether touch-up from the touch panel 70a has been performed. Processing proceeds to S1004 if touch-up has been performed and proceeds to S1001 if not.

In S1004, the system control unit 50 determines whether the shortest distance ($\Delta P2$) from a stored line-of-sight position to the current position of the touch pointer 406 moved in S1001 is greater than the first threshold value (Th1) and less than the second threshold value (Th2). Processing proceeds to S1005 if Th1<$\Delta P2$<Th2 and proceeds to S1008 if not. Meanwhile, $\Delta P1$ based on the one-point AF frame and $\Delta P2$ based on the touch pointer may be calculated through different calculation methods. For example, $\Delta P1$ is calculated on the basis of the position of the center of the one-point AF frame, whereas $\Delta P2$ may calculated on the basis of a predetermined position (the center of a face, the center of gravity, or the like) of an object tracked in response to pressing of the line-of-sight confirmation button 82.

In S1005, the system control unit 50 determines whether continuous AF is enabled. Processing proceeds to S1008 if continuous AF is enabled and proceeds to S1006 if not. In a scene photographed through an AF operation in which normal AF is performed, an object is a moving body in many cases. In such a case, touch-move (AF frame moving operation) after the AF frame has been moved to the proximity of an object according to a line of sight can be regarded as an operation for causing the AF frame to track the object simply for change in a relative position of the object displayed on the EVF (or display unit) instead of the accuracy of the line of sight. Accordingly, in S906 and S1005, the line-of-sight reflection flag is not set to 1, that is, CAL correction is not performed in the case of continuous AF. Meanwhile, embodiments of the present disclosure are not limited thereto and, in the case of one-point AF, execution of CAL correction even when continuous AF is enabled, and the like may be performed.

S1006, the system control unit 50 determines whether other conditions are satisfied. Processing proceeds to S1007 if the other conditions are satisfied and proceeds to S1008 if not. The other conditions may include, for example, at least any of a plurality of conditions below.

A variation in a relative position of an object displayed on the EVF (or display unit) is not more than a threshold value (because if the object is stabilized to some degree, it is considered that a user has finely adjusted the position of the touch pointer 406).

An organ (pupils or the like) of a human object is detected (because a scene photographed by detecting pupils of a person is considered to have many stationary objects).

Objects other than a person are not detected (because objects other than a person, that is, animals, vehicles, and the like are moving bodies in many cases).

In S1007, the system control unit 50 sets the line-of-sight reflection flag to 1.

In S1008, the system control unit 50 starts counting of an object confirmation timer. The object confirmation timer is a timer for executing object tracking processing after the lapse of a specific time from when the user performs touch-up.

In S1009, the system control unit 50 determines whether Th1<$\Delta P2$<Th2 is satisfied. Processing proceeds to S1026 if it is satisfied and proceeds to S1010 if not.

In S1010, the system control unit 50 performs movement completion processing in response to the operation in S1002. For example, when the operation in S1002 is an operation performed on the first shutter switch 62, the system control unit 50 tracks an object near the touch pointer 406 and executes AF. Accordingly, transition of the display of FIG. 4E to the display of FIG. 4H may occur, for example.

In S1011, the system control unit 50 determines whether touch-down has been performed on the touch panel 70a. Processing proceeds to S1014 if touch-down has been performed and proceeds to S1012 if not.

In S1012, the system control unit 50 determines whether counting of the object confirmation timer has expired. Processing proceeds to S1013 if counting has expired and proceeds to S1021 if not.

In S1013, the system control unit 50 sets the line-of-sight reflection flag to 0.

In S1014, the system control unit 50 determines whether touch-move has been performed on the touch panel 70a. Processing proceeds to S1017 if touch-move has been performed and proceeds to S1015 if not.

In S1015, the system control unit 50 determines whether touch-up from the touch panel 70a has been performed. Processing proceeds to S1016 if touch-up has been performed and proceeds to S1014 if not.

In S1016, the system control unit 50 determines whether an operation until touch-up of S1015 is a double tap. Processing proceeds to S1025 if the operation is the double tap and proceeds to S1021 if not.

In S1017, the system control unit 50 sets the line-of-sight reflection flag to 0.

S1018 is the same as S1001.

S1019 is the same as S1002. Processing proceeds to S1010 if the operation of completing the operation of moving the touch pointer 406 has been performed and proceeds to S1020 if not.

In S1020, the system control unit 50 determines whether touch-up from the touch panel 70a has been performed. Processing proceeds to S1008 if touch-up has been performed and proceeds to S1018 if not.

S1021 is the same as S1002. Processing proceeds to S1025 if the operation of completing the operation of moving the touch pointer 406 has been performed and proceeds to S1022 if not.

S1022 is the same as S917. Processing proceeds to S1023 if other operations have been performed and proceeds to S1011 if not.

In S1023, the system control unit 50 sets the line-of-sight reflection flag to 0.

S1024 is the same as S919.

In S1025, the system control unit 50 determines whether the line-of-sight reflection flag has been set to 1. Processing proceeds to S1026 if line-of-sight reflection flag=1 and proceeds to S1010 if not.

In S1026, the system control unit 50 performs CAL correction based on ΔP2.

Meanwhile, embodiments of the electronic apparatus of the present disclosure are not limited to electronic apparatuses equipped with a touch panel, the present invention is applicable to any device that can detect movement of an operating body (finger or pen) and move an indicator (selection position), for example. For example, embodiments of the present disclosure can be applied to a case in which an indicator, such as a pointing cursor or an item selection cursor, displayed on a display of a notebook PC is relatively moved according to a sliding operation performed by a finger (operating body) touching a touch pad of the notebook PC. Embodiments of the present disclosure are not limited to a touch operation and is also applicable to a case in which an indicator is relatively moved according to an operation of a joystick, a rotary dial, or the like that indicates a direction by tilting a member. Other embodiments of the present disclosure are also applicable to an apparatus equipped with only a few operating members, such as a wearable device. Furthermore, embodiments of the present disclosure are also applicable to an apparatus that detects a motion of a user's hand, such as a spatial gesture, or the like in a contactless manner and moves an indicator displayed on, for example, a projector according to the motion.

Meanwhile, various types of control performed by the system control unit 50 in the above description may be performed by a single piece of hardware, or a plurality of pieces of hardware (e.g., a plurality of processors or circuits) may control the overall operation of a device by performing processing in a distributed manner.

In addition, although various embodiments of the present disclosure have been described in detail on the basis of suitable embodiments, the present invention is not limited to a specific embodiment and various forms without departing from essential characteristics of the present invention are also included in the present disclosure. Furthermore, each of the above-described embodiments merely represents an embodiment of the present disclosure and the respective embodiments may be appropriately combined.

In addition, although a case in which embodiments of the present disclosure are applied to an imaging device (digital camera) is described in the above-described embodiments, the present invention is not limited thereto and is applicable to any electronic apparatus capable of receiving line-of-sight input or a moving operation, for example. For example, embodiments of the present disclosure are applicable to personal computers, PDAs, cellular phones, portable image viewers, printer devices, digital photo frames, music players, game consoles, electronic book readers, and the like. Further, embodiments of the present disclosure are applicable to video players, display devices (including projection devices), tablet terminals, smartphones, AI speakers, household electronic devices, on-board devices, and the like.

In addition, embodiments of the present disclosure are not limited to an imaging device main body and is also applicable to a control device that communicates with an imaging device (including a network camera) through wired or wireless communication and remotely controls the imaging device. As a device that remotely controls an imaging device, for example, devices such as a smartphone, a tablet PC, or a desktop PC may be conceived. An imaging device can be remotely controlled by a control device notifying the imaging device of a command for causing the imaging device to perform various operations or settings on the basis of an operation performed at the side of the control device or processing performed at the side of the control device. Further, the control device may receive a live view image photographed by the imaging device through wired or wireless communication and display the live view image at the side of the control device.

According to various embodiments of the present disclosure, it is possible to provide an electronic apparatus capable of executing calibration such that the accuracy of line-of-sight input in ordinary use is improved more reliably.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-091237, filed on May 26, 2020, which is hereby incorporated by reference herein in its entirety.

What is claimed is:

1. An electronic apparatus comprising:
   a line-of-sight input member configured to receive a line-of-sight input that identifies a line-of-sight position that is in accordance with a line of sight of a user; and
   at least one memory and at least one processor which function as a control unit configured to perform control such that
   an indicator is displayed at a first position based on the line-of-sight input,
   the indicator is moved from the first position to a second position according to a moving operation performed on an operating member that receives a user operation different from the line-of-sight input,
   (a) calibration of the line-of-sight position, on a basis of the first position and the second position, is not performed in a case where an instruction operation for executing specific processing at a position of the indicator is not performed, and
   (b) calibration of the line-of-sight position is performed on the basis of the first position and the second position in a case where an instruction operation for executing the specific processing at the position of the indicator is performed in a state in which there is no additional moving operation, and a specific condition is satisfied.

2. The electronic apparatus according to claim 1, wherein, in a case where the specific condition is not satisfied, the control unit performs control such that calibration of the line-of-sight position, on the basis of the first position and the second position, is not performed even if an instruction operation for executing the specific processing is performed.

3. The electronic apparatus according to claim 2, wherein the specific condition includes a condition that a distance between the first position and the second position is greater than a first threshold value.

4. The electronic apparatus according to claim 2, wherein the specific condition includes a condition that the distance between the first position and the second position is smaller than a second threshold value.

5. The electronic apparatus according to claim 2, wherein the at least one memory and the at least one processor further function as a detection unit configured to detect an object, and
   the specific condition includes that a specific object is detected by the detection unit.

6. The electronic apparatus according to claim 2, wherein the at least one memory and the at least one processor further function as a detection unit configured to detect an object, and
   the specific condition includes at least one of
   a condition that variation in a position of an object detected by the detection unit is not more than a threshold value,
   a condition that a pupil of a person is detected by the detection unit, and
   a condition that an animal or a vehicle is not detected by the detection unit.

7. The electronic apparatus according to claim 2, wherein the specific condition includes that a mode in which continuous AF is performed is not set.

8. The electronic apparatus according to claim 2, wherein the specific condition includes that a plurality of position inputs are not performed on the operating member.

9. The electronic apparatus according to claim 1, wherein the specific processing is at least one of auto focus and tracking.

10. The electronic apparatus according to claim 1, wherein the instruction operation for executing the specific processing includes a specific touch operation.

11. The electronic apparatus according to claim 10, wherein the specific touch operation is a double tap.

12. The electronic apparatus according to claim 1, wherein the control unit performs control such that
    the calibration is performed on a basis of the first position and the second position in a mode in which AF is performed at a position designated by the user, and
    the calibration is performed on a basis of the first position and a position of an object selected on a basis of the second position in a mode in which AF is performed at a position of an object selected on a basis of a position designated by the user.

13. The electronic apparatus according to claim 1, wherein the control unit performs control such that the calibration is performed on a basis of only longitudinal components of the first position and the second position in a case where the calibration of the line-of-sight position is performed on the basis of the first position and the second position.

14. The electronic apparatus according to claim 1, wherein the control unit further performs control such that a guide indicating whether to perform the calibration is displayed in a case where the calibration of the line-of-sight position is performed on the basis of the first position and the second position.

15. The electronic apparatus according to claim 1, wherein the at least one memory and the at least one processor further function as a setting unit configured to set, according to a user operation, whether to perform the calibration, on the basis of the first position and the second position, of the line-of-sight position.

16. The electronic apparatus according to claim 1, wherein the moving operation is an operation of moving an operating body in a state in which the operating body touches an operating surface.

17. A control method of an electronic apparatus, comprising:
    receiving a line-of-sight input that identifies is-a line-of-sight position that is accordance with a line of sight of a user; and
    performing control such that
    an indicator is displayed at a first position based on the line-of-sight input, the indicator is moved from the first position to a second position according to a moving operation performed on an operating member that receives a user operation different from the line-of-sight input, (a) calibration of the line-of-sight position, on a basis of the first position and the second position, is not performed in a case where an instruction operation for executing specific processing at a position of the indicator is not performed, and (b) calibration of the line-of-sight position is performed on the basis of the first position and the second position in a case where an instruction operation for executing the specific processing at the position of the indicator is performed in a state in which there is no additional moving operation, and a specific condition is satisfied.

18. An electronic apparatus comprising:

a line-of-sight input member configured to receive a line-of-sight input that identifies a line-of-sight position that is in accordance with a line of sight of a user; and a control unit configured to perform control such that an indicator is displayed at a first position based on the line-of-sight input, the indicator is moved from the first position to a second position according to a moving operation performed on an operating member that receives a user operation different from the line-of-sight input, (a) calibration of the line-of-sight position, on a basis of the first position and the second position, is not performed in a case where specific processing is not executed at a position of the indicator, and (b) calibration of the line-of-sight position is performed on the basis of the first position and the second position in a case where the specific processing is executed at the position of the indicator in a state in which there is no additional moving operation, and a specific condition is satisfied.

19. A non-transitory computer readable medium that stores a program, wherein the program causes a computer to execute the control method according to claim 17.

* * * * *